(12) United States Patent
Lee et al.

(10) Patent No.: US 8,798,537 B2
(45) Date of Patent: Aug. 5, 2014

(54) TWO-WAY COMMUNICATION IN WIRELESS POWER TRANSFER

(75) Inventors: Jaesung Lee, Gyeonggi-Do (KR); Dohyeon Son, Seoul (KR); Yongcheol Park, Gyeonggi-Do (KR); Jeongkyo Seo, Gyeonggi-Do (KR); Seonghun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 13/534,996

(22) Filed: Jun. 27, 2012

(65) Prior Publication Data
US 2012/0329405 A1 Dec. 27, 2012

Related U.S. Application Data

(60) Provisional application No. 61/501,591, filed on Jun. 27, 2011, provisional application No. 61/501,584, filed on Jun. 27, 2011, provisional application No. 61/511,431, filed on Jul. 25, 2011.

(51) Int. Cl.
*H04B 5/00* (2006.01)
*H04B 1/38* (2006.01)

(52) U.S. Cl.
USPC ............. 455/41.1; 455/573; 455/343.1

(58) Field of Classification Search
USPC ........ 455/573, 343.1, 69, 41.1; 320/104, 108; 340/5.8, 455
See application file for complete search history.

(56) References Cited

U.S. PATENT DOCUMENTS

| 2006/0184705 | A1* | 8/2006 | Nakajima | 710/303 |
| 2007/0021140 | A1* | 1/2007 | Keyes et al. | 455/522 |
| 2011/0074342 | A1* | 3/2011 | MacLaughlin | 320/108 |
| 2012/0202435 | A1* | 8/2012 | Kim et al. | 455/69 |
| 2012/0268238 | A1* | 10/2012 | Park et al. | 340/5.8 |
| 2012/0311363 | A1* | 12/2012 | Kim et al. | 713/323 |
| 2013/0002191 | A1* | 1/2013 | Jung et al. | 320/103 |
| 2013/0057078 | A1* | 3/2013 | Lee et al. | 307/104 |
| 2013/0264997 | A1* | 10/2013 | Lee et al. | 320/106 |

\* cited by examiner

*Primary Examiner* — Sonny Trinh
(74) *Attorney, Agent, or Firm* — Birch, Stewart, Kolasch & Birch, LLP

(57) ABSTRACT

Disclosed herein is a wireless power transmitter for solving a problem that a collision occurs when recognizing an initial wireless power receiver in two-way communication of wireless power transmission. A wireless power transmitter according to a first embodiment disclosed herein may include a transceiver configured to transmit and/or receive a message to and/or from a wireless power receiver; and a controller configured to control the transceiver to transmit a message for requesting identification information to the wireless power receiver, and determine whether the identification information is validly received from the wireless power receiver by the transceiver in response to the identification information request, and control the transceiver to transmit a message for requesting sleep mode switching to the wireless power receiver when the identification information is validly received by the transceiver.

20 Claims, 57 Drawing Sheets

Wireless Power Transmitter

Wireless Power Receiver

Principles – WPT using a magnetic inductive coupling

Tx in a magnetic inductive coupling

Rx in a magnetic inductive coupling

Transmitter with Arrayed Tx coils

Principles – WPT using a magnetic resonance coupling

Tx in a magnetic resonance coupling

Rx in a magnetic resonance coupling

Transmitter with Arrayed Tx coils

Operation Phases

Signal Strength Packet

Identification Packet

Extended Identification Packet

Configuration Packet

Control Error Packet

End Power Transfer Packet

FIG. 26B

| Cmd | Instruction |
|---|---|
| 0x01 | Status request |
| 0x02 | Power Off |
| ... | data |
| 0x0f | data |

FIG. 26C

| data | Response according to TX instruction |
|---|---|
| 0x01 | |
| 0x02 | |
| ... | |
| 0x0f | |

FIG. 38A

| Request ID | Time slot 0 | Time slot 1 | Time slot 2 | Time slot 3 | Time slot 4 | Time slot 5 | Time slot 6 | Time slot 7 | Time slot 8 | Time slot 9 |
|---|---|---|---|---|---|---|---|---|---|---|
| | RCV 1 RCV 2 | RCV 3 | RCV 4 | RCV 5 | | | | | | |

Power transfer — Power transfer — Power transfer

TWO-WAY COMMUNICATION IN WIRELESS POWER TRANSFER

RELATED APPLICATION

Pursuant to 35 U.S.C. §119(e), this application claims the benefit of earlier filing date and right of priority to U.S. Provisional Application No. 61/501,591, filed on Jun. 27, 2011, U.S. Provisional Application No. 61/501,584, filed on Jun. 27, 2011 and U.S. Provisional Application No. 61/511,431, filed on Jul. 25, 2011, the contents of which is incorporated by reference herein in its entirety.

BACKGROUND OF THE INVENTION

1. Field of the Invention

The embodiments disclosed in the present disclosure relates to a wireless power transmitter and method using the same, and more particularly, to a wireless power transmitter and method using the same for performing two-way communication.

2. Description of the Related Art

In recent years, the method of contactlessly supplying electrical energy to electronic devices in a wireless manner has been used instead of the traditional method of supplying electrical energy in a wired manner. The electronic device receiving energy in a wireless manner may be directly driven by the received wireless power, or a battery may be charged by using the received wireless power, then allowing the electronic device to be driven by the charged power.

SUMMARY OF THE INVENTION

A first embodiment disclosed herein is to solve a problem that a collision occurs when recognizing an initial wireless power receiver in two-way communication of wireless power transfer.

Furthermore, a second embodiment disclosed herein is to solve a problem that a collision occurs when recognizing a single/multiple wireless power receiver(s) in two-way communication of wireless power transfer.

Furthermore, a third embodiment disclosed herein is to solve ID recognition and collision between wireless power receivers in wireless power transfer using two-way communication.

In order to solve the foregoing technical task, a wireless power transmitter according to a first embodiment disclosed herein may include a transceiver configured to transmit and/or receive a message to and/or from a wireless power receiver; and a controller configured to control the transceiver to transmit a message for requesting identification information to the wireless power receiver, and determine whether the identification information is validly received from the wireless power receiver by the transceiver in response to the identification information request, and control the transceiver to transmit a message for requesting sleep mode switching to the wireless power receiver when the identification information is validly received by the transceiver.

According to an embodiment, the controller may control the transceiver to transmit a message for requesting identification information to the wireless power receiver again when the identification information is not validly received.

Furthermore, according to an embodiment, the controller may be changed to a power transmission state when a response to the identification information request is not received any more.

Furthermore, according to an embodiment, the controller may register the identification information of the wireless power receiver.

Furthermore, according to an embodiment, the controller may determine that the identification information is validly received when a first message for receiving identification information from the wireless power receiver is not collided with a second message for receiving identification information from another wireless power receiver.

On the other hand, in order to solve the another technical task, a wireless power transmitter according to a second embodiment disclosed herein may include a transceiver configured to transmit and/or receive a message to and/or from a wireless power receiver; and a controller configured to control the transceiver to transmit a message for requesting identification information to the wireless power receiver, and receive a message containing identification information from a first wireless power receiver in response to the identification information request, and transmit a message for requesting status information to the first wireless power receiver, wherein the message for requesting status information includes the identification information of the first wireless power receiver.

According to an embodiment, the controller may control the transceiver to receive a message containing status information from the first wireless power receiver in response to the identification information request from the wireless power receiver.

Furthermore, according to an embodiment, the controller may include a controller configured to control the transceiver to receive a message containing identification information from a second wireless power receiver in response to the identification information request, and transmit a message for requesting status information to the second wireless power receiver, and the message for requesting status information includes the identification information of the second wireless power receiver.

Furthermore, according to an embodiment, the controller may control the transceiver to receive a message containing status information from the second wireless power receiver in response to the identification information request from the wireless power receiver.

Furthermore, according to an embodiment, the first identification information and the second identification information may be different from each other.

Furthermore, according to an embodiment, the message containing status information further may include the identification information of the first wireless power transmitter.

Furthermore, according to an embodiment, the controller may register the identification information of the wireless power receiver.

On the other hand, in order to solve the still another technical task, a wireless power transmitter according to a third embodiment disclosed herein may include a transceiver configured for transmitting and/or receiving a message to and/or from a wireless power receiver; and a controller configured to control the transceiver to transmit a message for requesting identification information to the wireless power receiver, and determine whether the identification information is validly received from the first and the second wireless power receiver by the transceiver in response to the request, wherein the identification information is received through a time slot selected by the first and the second wireless power receiver, respectively, among a plurality of time slots, and change the time slot assigned to at least one of the first and the second wireless power receiver when the identification information is not validly received from the first and second wireless power receiver.

According to an embodiment, the controller may transmit information on the changed time slot to at least one of the first and second wireless power receiver.

Furthermore, according to an embodiment, the controller may control the transceiver to transmit a message for the identification information to the wireless power receiver again.

Furthermore, according to an embodiment, the controller may register the identification information of the first and second wireless power receiver when the identification information is validly received from the first and second wireless power receiver.

Furthermore, according to an embodiment, the message for requesting identification information may include the number of the plurality of time slots.

Furthermore, according to an embodiment, the controller may wait for a period of time corresponding to the number of the plurality of time slots subsequent to transmitting the message for requesting identification information.

Furthermore, according to an embodiment, the controller may be immediately changed to a power transmission state when identification information is validly received from the first and second wireless power receiver.

Furthermore, according to an embodiment, the controller may change a time slot assigned to at least one of the first and second wireless power receiver to a vacant time slot.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 26A through 26C are views illustrating a packet containing a request/response message used during the two-way communication process according to the embodiments disclosed herein;

FIGS. 38A and 38B are other conceptual views illustrating an ID recognition and collision resolution process of a wireless power transmitter 100 not requiring a sleep mode of the wireless power receiver 200 according to an embodiment disclosed herein.

DETAILED DESCRIPTION OF THE INVENTION

Figure 1:
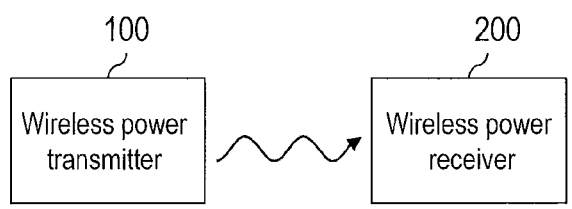
FIG. 1 is an exemplary view conceptually illustrating a wireless power transmitter and a wireless power receiver according to the embodiments of the present invention.

The technologies disclosed herein may be applicable to wireless power transmission. However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication refers to a method in which one transmitter (TX) communicates with a plurality of receivers (RXs), and unidirectional communication refers to a communication method in which a receiver merely transmits a required message only to a transmitter, and bidirectional communication refers to a communication method in which message transfer is enabled in both directions, in other words, from a receiver to a transmitter and from a transmitter to a receiver.

Prior Art and Problems

A transmitter can transfer power to a receiver using an one-to-one unidirectional communication method, in other words, a method of performing one-to-one communication between one transmitter and one receiver.

However, in case where one transmitter performs communication with a plurality of receivers, it may be difficult to perform communication using the prior art.

It is because a collision may occur between messages that have been sent to the same time slot when a plurality of receivers transfer messages to a transmitter at the same time, and an error may occur in the transferred messages due to the collision. Such a problem may occur in both the unidirectional and bidirectional communication schemes.

As a result, the transmitter may be unable to transfer power due to the collision while the transmitter performs communication with a plurality of receivers.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, a wireless power receiver for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal, (for example, a portable phone, a cellular phone, and a tablet or multimedia device).

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transmission in the inductive coupling method is a technology transmitting power in a wireless manner using a primary coil and a secondary coil, and refers to the transmission of power by inducing a current from a coil to another coil through a changing magnetic field by magnetic induction phenomenon.

Wireless power transmission in the magnetic resonance coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2A:
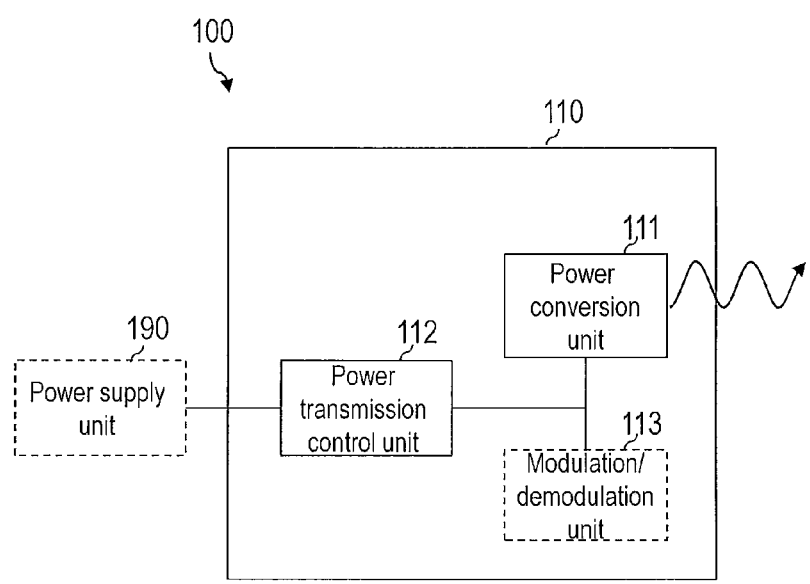
FIGS. 2A and 2B are exemplary block diagrams illustrating the configuration of a wireless power transmitter 100 and an wireless power receiver 200 that can be employed in the embodiments disclosed herein, respectively.
Figure 2B:
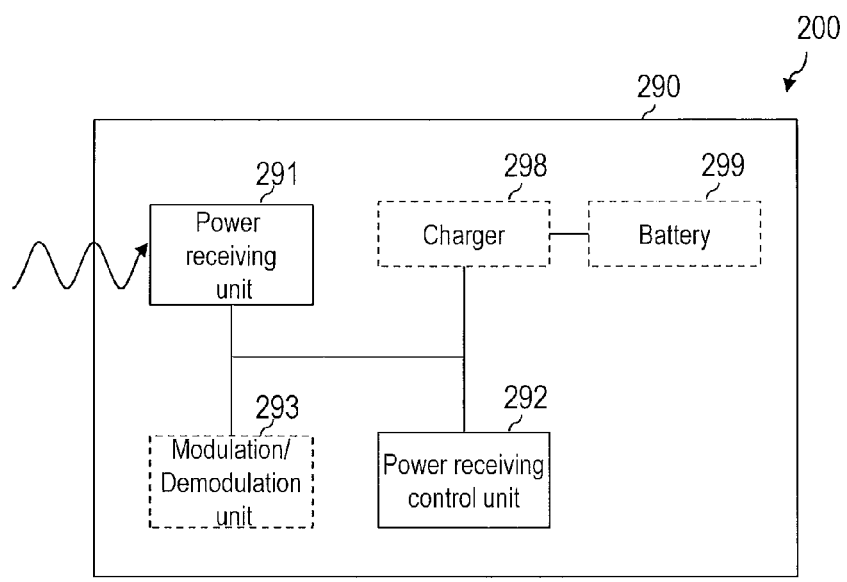

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from the transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonance frequency to generate a resonance frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, an region to which the wireless power signal can be approached may be divided into two types. First, active area denotes a region through which a wireless power signal transferring power to the wireless power receiver 200 is passed. Next, semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transmission according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transmission based on the power control message. For example, the signal detector 10 may receive information associated with the wireless power receiver 200 to be auditorily or visually outputted through the power control message, or receive information required for authentication between devices.

In order to receive the foregoing power control message, the power transmission control unit 112 may use at least one of a method for receiving it through the wireless power signal and a method for receiving other user data.

In order to receive the power control message, the wireless power transmitter 100 may further include a power communications modulation/demodulation unit 113 electrically connected to the power conversion unit 111. The power communications modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[In Case of Supporting In-Band Two-Way Communication]

Furthermore, in a wireless power transmission environment capable of two-way communication according to the embodiments disclosed herein, the power transmission control unit 112 may transmit data to the wireless power receiver 200. The data transmitted by the power transmission control unit 112 may request the wireless power receiver 200 to send a power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power receiving control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. Furthermore, the power receiving unit 291, as a constituent element according to the resonance coupling method, may include a coil and a resonant circuit in which resonance phenomenon is generated by a magnetic field having a specific resonance frequency.

However, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power receiving control unit 292 may control each constituent element included in the power supply unit 290.

Specifically, the power receiving control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In order to transmit the foregoing power control message, the power receiving control unit 292 may use at least one of a method for transmitting it through the wireless power signal and a method for transmitting other user data.

In order to transmit the power control message, the wireless power receiver 200 may further include a power communications modulation/demodulation unit 293 electrically connected to the power receiving unit 291. The power communications modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power receiving control unit 292 controls the power communications modulation/demodulation unit 293 at the side of the wireless power receiver 200 to modulate the wireless power signal. For instance, the power receiving control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the power communications modulation/demodulation unit 113 at the side of the wireless power transmitter 100 may detect a change of the current and/or voltage to perform a demodulation process.

In other words, the power receiving control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, in some embodiments, the power receiving control unit 292 may transmit a power control message to the wireless power transmitter 100 by transmitting user data including the power control message by a communication means (not shown) included in the wireless power receiver 200.

[In Case of Supporting In-Band Two-Way Communication]

Furthermore, in a wireless power transmission environment capable of two-way communication according to the embodiments disclosed herein, the power receiving control unit 292 may transmit user data containing a power control message by a communication means (not shown), thereby transmitting the power control message to the wireless power transmitter 100.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power receiving control unit 292 may control the charger 298 to perform charging using the transferred power.

Hereinafter, a wireless power transmitter and a wireless power receiver applicable to the embodiments disclosed herein will be described. First, a method of allowing the wireless power transmitter to transfer power to the wireless power receiver according to the inductive coupling method will be described with reference to FIGS. 3 through 5.

Inductive Coupling Method

Figure 3:
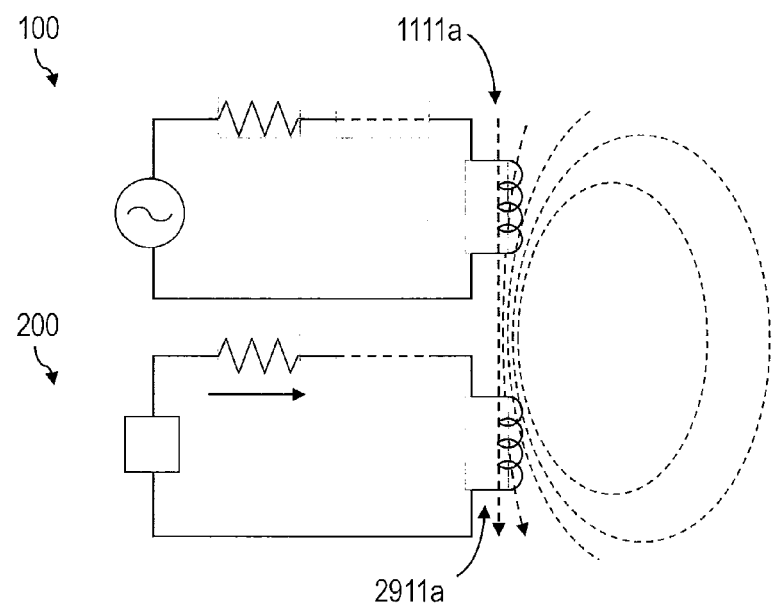
FIG. 3 is a view illustrating a concept in which power is transferred from a wireless power transmitter to an wireless power receiver in a wireless manner according to an inductive coupling method.

FIG. 3 is a view illustrating a concept in which power is transferred from a wireless power transmitter to a wireless power receiver in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil 1111a to be changed, then the power receiving unit 291 controls power to be supplied to the wireless power receiver 200 using an electromotive force induced to the receiving coil 2911a.

The efficiency of wireless power transmission by the inductive coupling method may be little affected by a frequency characteristic, but affected by an alignment and distance between the wireless power transmitter 100 and the wireless power receiver 200 including each coil.

On the other hand, in order to perform wireless power transmission in the inductive coupling method, the wireless power transmitter 100 may be configured to include an interface surface (not shown) in the form of a flat surface. One or more wireless power receivers may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement wireless power transmission by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, a configuration of the wireless power transmitter and wireless power receiver using an inductive coupling method applicable to the embodiments disclosed herein will be described in detail.

Figure 4A:
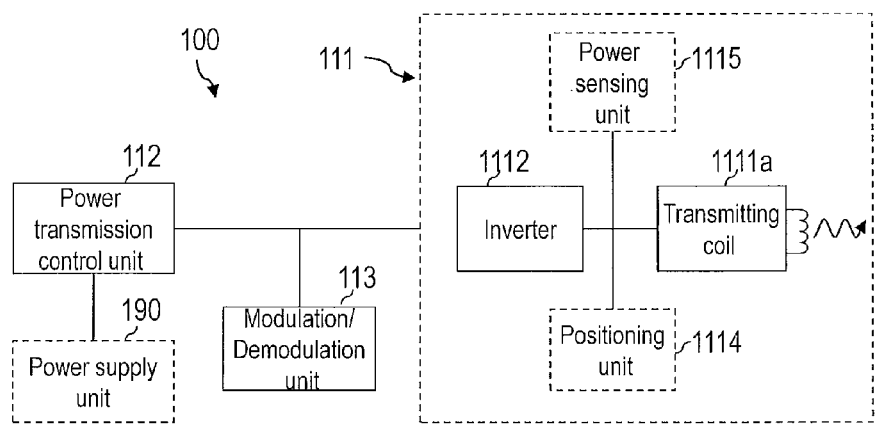
FIGS. 4A and 4B are block diagrams illustrating part of the wireless power transmitter 100 and wireless power receiver 200 in a magnetic induction method that can be employed in the embodiments disclosed herein.
Figure 4B:
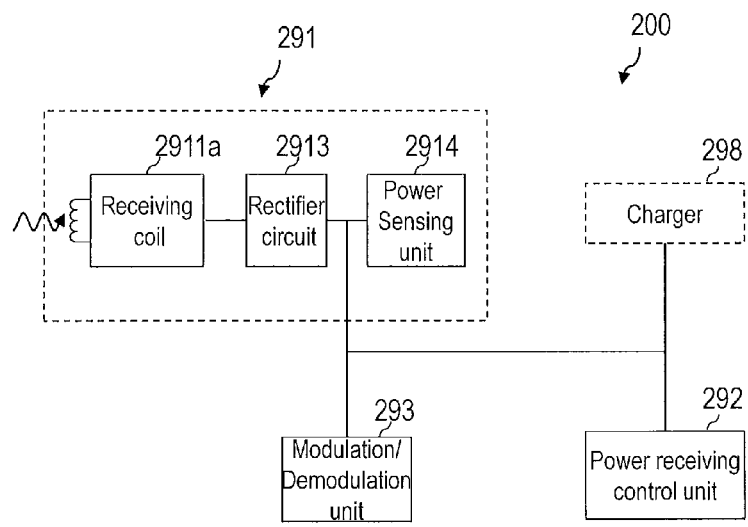

Wireless Power Transmitter and Wireless Power Receiver in Inductive Coupling Method FIGS. 4A and 4B are block diagrams illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of wireless power transmission using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transfer. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115 may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier circuit 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier circuit 2913 performs a full-wave rectification to a current to convert alternating current into direct current. The rectifier circuit 2913, for instance, may be implemented with a full-bridge rectifier circuit made of four diodes or a circuit using active components.

In addition, the rectifier circuit 2913 may further include a regulator circuit for converting a rectified current into a more flat and stable direct current. Furthermore, the output power of the rectifier circuit 2913 is supplied to each constituent element of the power supply unit 290. Furthermore, the rectifier circuit 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power receiving control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier circuit 2913, and if the voltage and/or current of the rectified power exceeds a threshold value as a result of monitoring, then the power receiving control unit 292 transmits a power control message to the wireless power transmitter 100 to transfer suitable power.

Wireless Power Transmitter Configured to Include One or More Transmitting Coils

Figure 5:
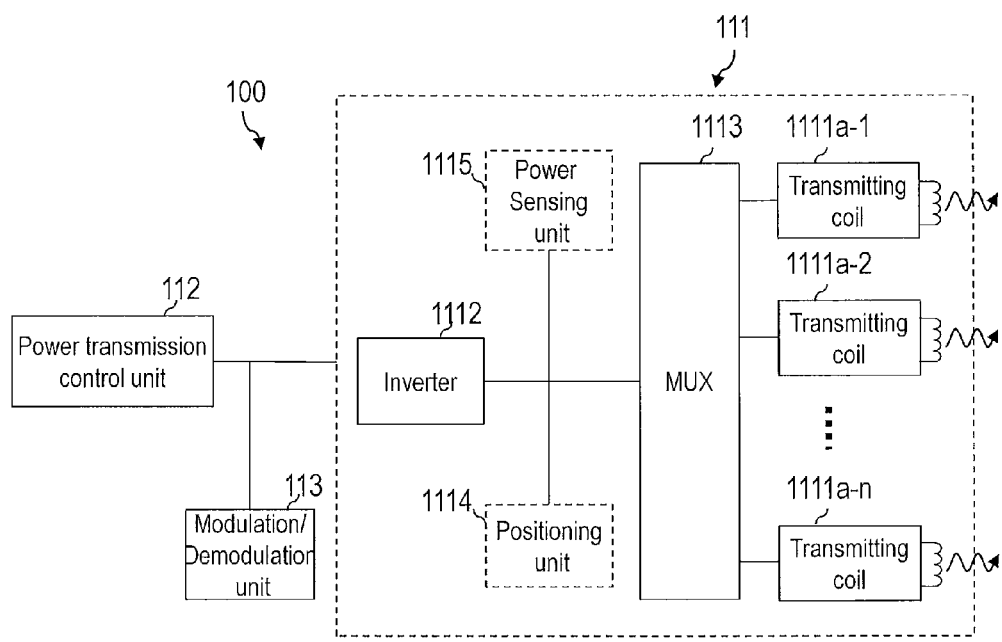
FIG. 5 is a block diagram illustrating a wireless power transmitter configured to have one or more transmission coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils

1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
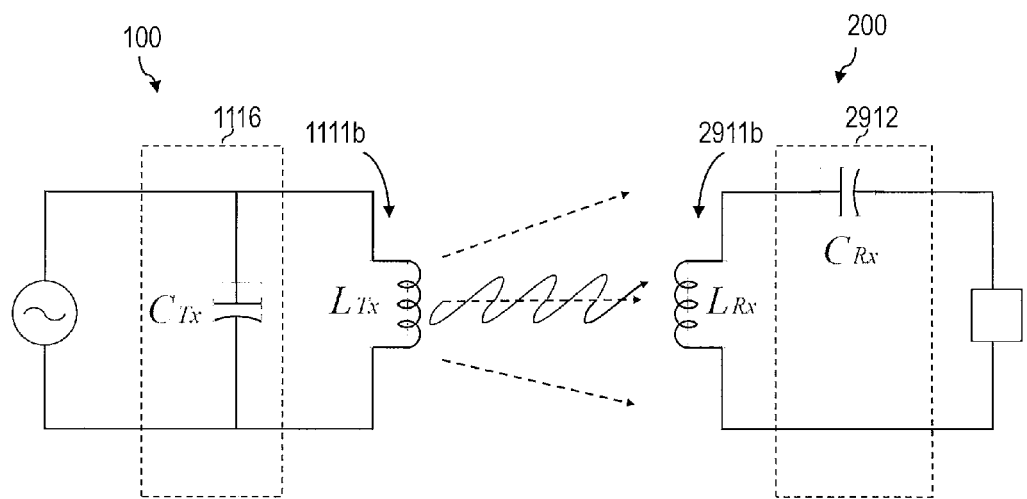
FIG. 6 is a view illustrating a concept in which power is transferred to an wireless power receiver from a wireless power transmitter in a wireless manner according to an resonance coupling method.

FIG. 6 is a view illustrating a concept in which power is transferred to a wireless power receiver from a wireless power transmitter in a wireless manner according to an resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonance frequency may be determined by the following formula in Equation 1.

$$f = \frac{1}{2\pi\sqrt{LC}} \qquad \text{[Equation 1]}$$

Here, the resonance frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonance frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonance frequency determined based on an inductance of the receiving coil 2911b and a capacitance of the resonant circuit 2912 has the same frequency as a resonance frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

According to a wireless power transmission method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of wireless power transmission by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and a wireless power receiver in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

Figure 7A:
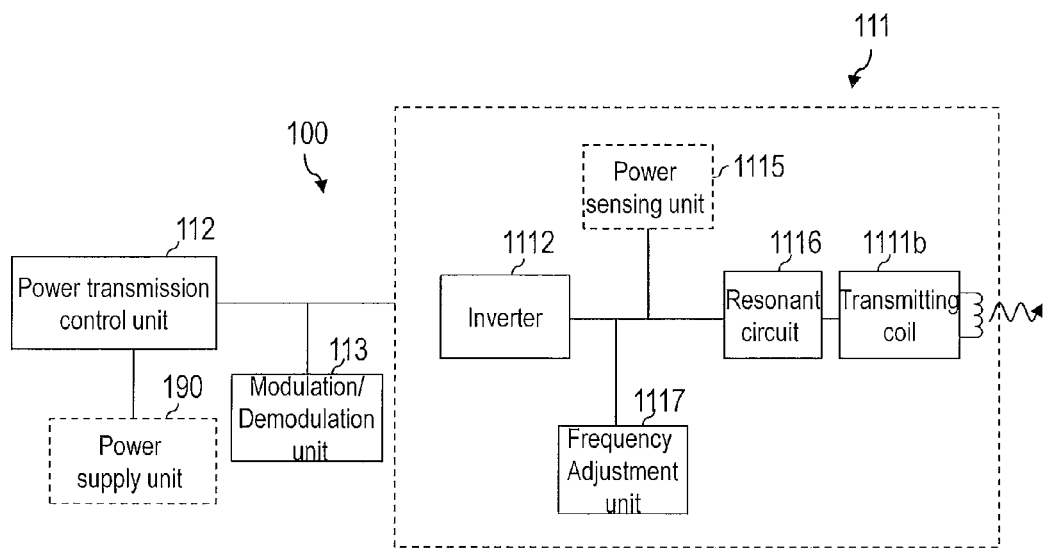
FIG. 7 is a block diagram illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonance frequency of the power conversion unit 111. The resonance frequency of the power conversion unit 111 is determined based on an inductance and/or capacitance within a circuit constituting the power conversion unit 111 by Equation 1, and thus the power transmission control unit 112 may determine the resonance frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance.

On the other hand, the power conversion unit 111 may further include a power sensing unit 1115. The operation of the power sensing unit 1115 is the same as the foregoing description.

Figure 7B:
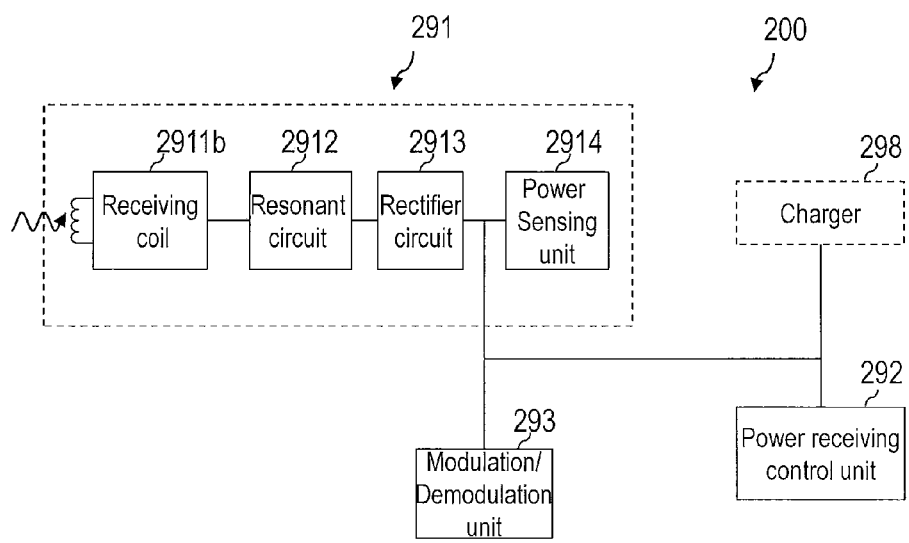

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier circuit 2913 for converting an AC current generated by resonance phenomenon into DC. The rectifier circuit 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

Figure 8:
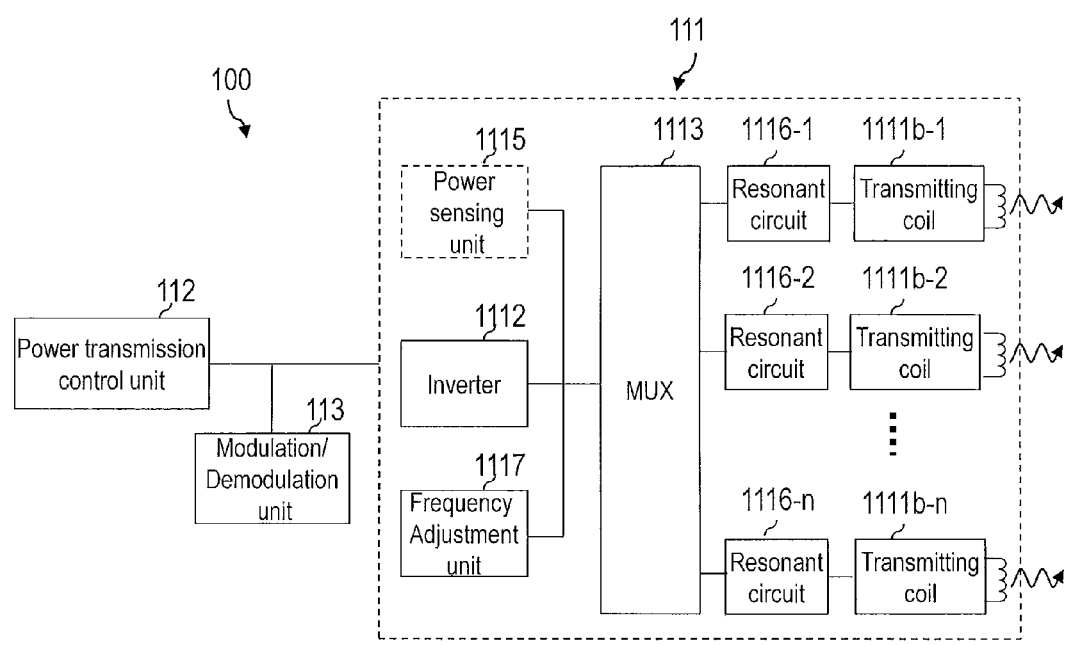
FIG. 8 is a block diagram illustrating a wireless power transmitter configured to have one or more transmission coils receiving power according to an resonance coupling method that can be employed in the embodiments disclosed herein.

FIG. 8 is a block diagram illustrating a wireless power transmitter configured to have one or more transmission coils receiving power according to an resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

Figure 9:
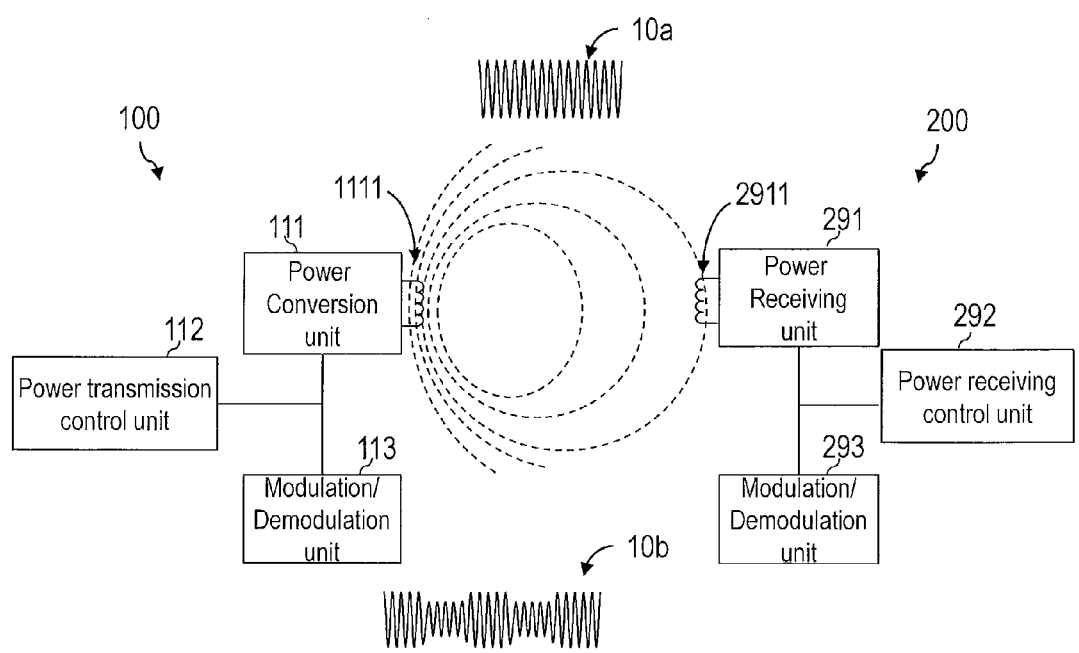
FIG. 9 is a view illustrating the concept of transmitting and receiving a packet between a wireless power transmitter and an electronic device through the modulation and demodulation of a wireless power signal in wireless power transfer according to the embodiments disclosed herein.

FIG. 9 is a view illustrating the concept of transmitting and receiving a packet between a wireless power transmitter and an electronic device through the modulation and demodulation of a wireless power signal in wireless power transfer according to the embodiments disclosed herein.

Referring to FIG. 9, the power conversion unit 111 included in the wireless power transmitter 100 forms a wireless power signal. The wireless power signal is formed through the transmitting coil 1111 included in the power conversion unit 111.

A wireless power signal 10a formed by the power conversion unit 111 arrives at the electronic device 200, and received through the power receiving unit 291 included in the electronic device 200. The formed wireless power signal is received through the a receiving coil 2911 included in the power receiving unit 291.

The power receiving control unit 292 controls the modulation/demodulation unit 293 connected to the power receiving unit 291 to modulate the wireless power signal while the electronic device 200 receives the wireless power signal. When the received wireless power signal is modulated, the wireless power signal forms a closed-loop within a magnetic field or electromagnetic field, and therefore, the wireless power transmitter 100 may detect the modulated wireless power signal 10b. The modulation/demodulation unit 113 may demodulates the detected wireless power signal, and decodes the packet from the modulated wireless power signal.

On the other hand, a modulation method used for communication between the wireless power transmitter 100 and the electronic device 200 may be amplitude modulation. As described above, the amplitude modulation method may be a backscatter modulation method in which the power communications modulation/demodulation unit 293 at the side of the electronic device 200 changes an amplitude of the wireless power signal 10a formed by the power conversion unit 111 and the power receiving control unit 292 at the side of the wireless power transmitter 100 detects an amplitude of the modulated wireless power signal 10b.

Modulation and Demodulation of Wireless Power Signal

Hereinafter, the modulation and demodulation of a packet transmitted and received between the wireless power transmitter 100 and the electronic device 200 will be described with reference to FIGS. 10 and 11.

Figure 10:
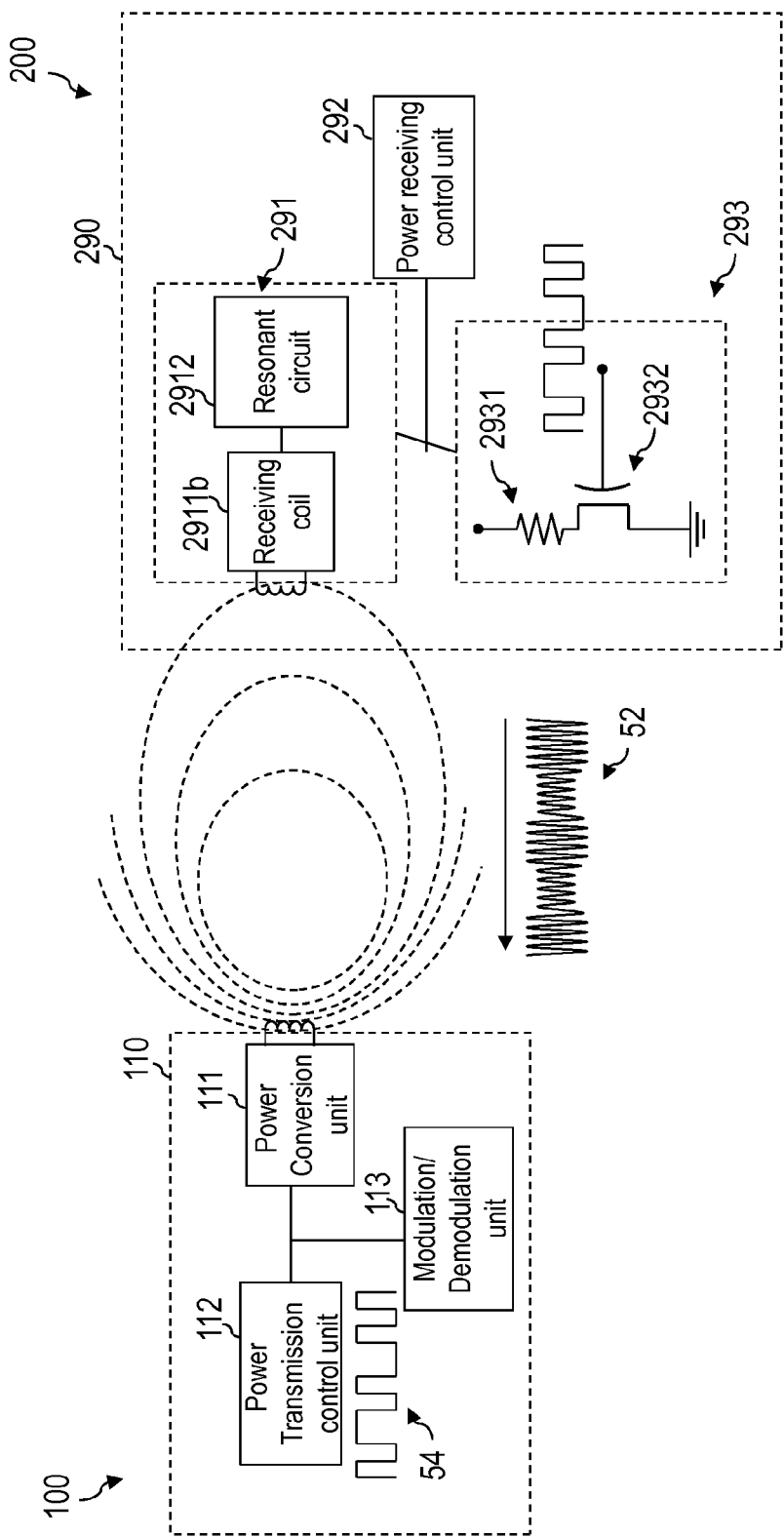
FIG. 10 is a view illustrating the configuration of transmitting and receiving a power control message in wireless power transfer according to the embodiments disclosed herein.
Figure 11:
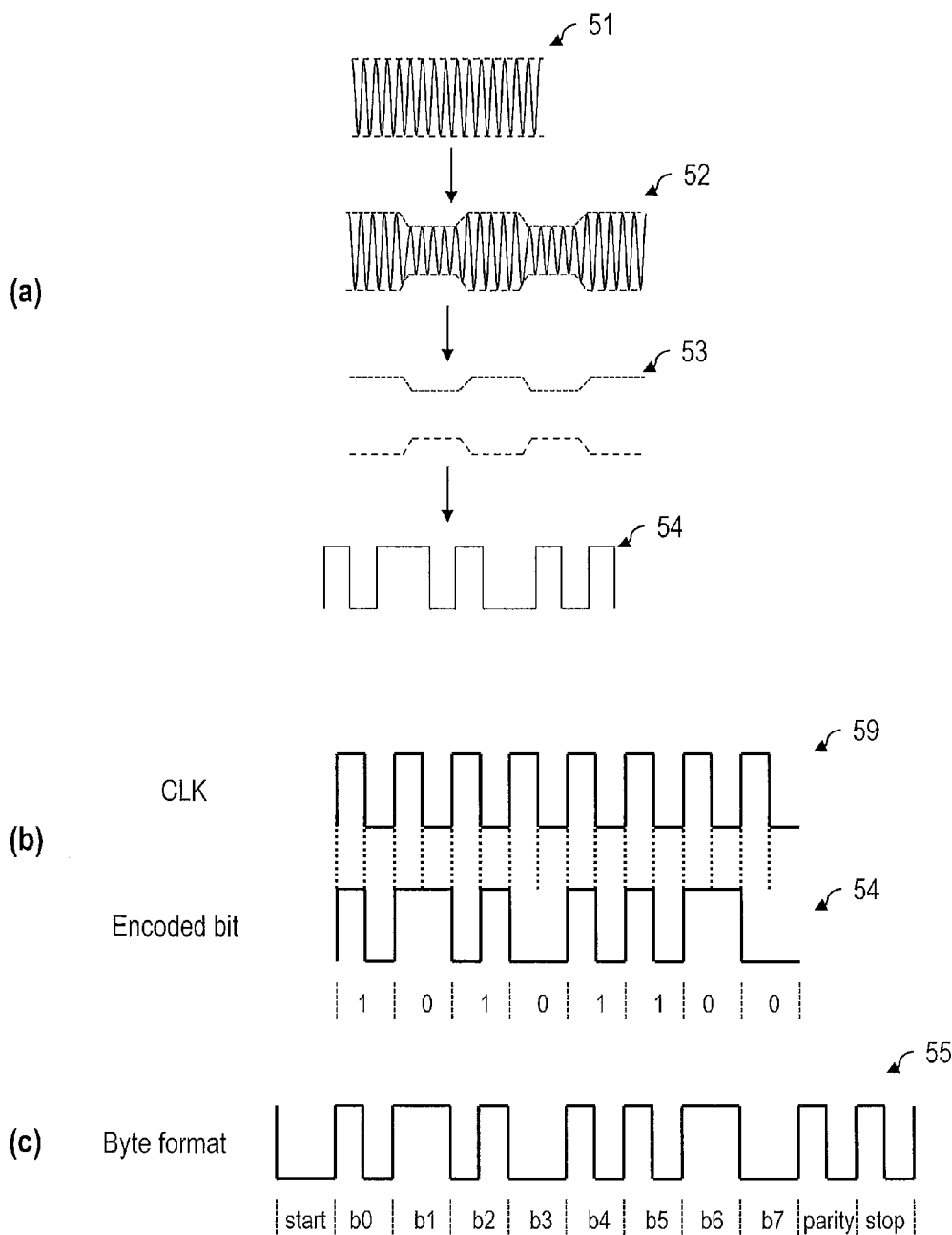
FIG. 11 is a view illustrating the form of a signal in the modulation and demodulation carried out in wireless power transfer according to the embodiments disclosed herein.

FIG. 10 is a view illustrating the configuration of transmitting and receiving a power control message in wireless power transfer according to the embodiments disclosed herein, and FIG. 11 is a view illustrating the form of a signal in the modulation and demodulation carried out in wireless power transfer according to the embodiments disclosed herein.

Referring to FIG. 10, the wireless power signal received through the power receiving unit 291 at the side of the electronic device 200 is a wireless power signal 51 that is not modulated as illustrated in FIG. 11A. A resonance coupling between the electronic device 200 and the wireless power transmitter 100 is implemented according to a resonant frequency set by the resonant formation circuit 2912 within the power receiving unit 291, and the wireless power signal 51 is received through the receiving coil 2911b.

The power receiving control unit 292 modulates the wireless power signal 51 received through the power receiving unit 291 by changing a load impedance within the power communications modulation/demodulation unit 293. The power receiving control unit 292 may include a passive element 2931 and an active element 2932 for modulating the wireless power signal 51. The modulation/demodulation unit 293 modulates the wireless power signal 51 to include a packet desired to be transmitted to the wireless power transmitter 100. At this time, the packet may be input to the active element 2932 within the power communications modulation/demodulation unit 293.

Then, the power transmission control unit 112 at the side of the wireless power transmitter 100 demodulates the modulated wireless power signal 52 through an envelope detection process, and decodes the detected signal 53 into digital data 54. The demodulation process detects a current or voltage flowing into the power conversion unit 111 to be classified into two states, a HI state and a LO state, and acquires a packet to be transmitted by the electronic device 200 based on digital data classified according to the states.

Hereinafter, a process in which the wireless power transmitter 100 acquires a power control message to be transmitted by the electronic device 200 from the modulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the electronic device 200. In some embodiments, the bit encoding method may be non-return to zero (NRZ). In some embodiments, the bit encoding method may bi-phase encoding.

For instance, the detected bit may be a differential bi-phase (DBP) encoded bit. According to the DBP encoding, the power receiving control unit 292 at the side of the electronic device 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using a 11-bit asynchronous serial format as illustrated in FIG. 11C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[In Case of Supporting In-Band Two-Way Communication]

As described above, FIG. 9 has illustrated that the wireless power receiver 200 transmits a packet using a carrier signal 10a formed by the wireless power transmitter 100, but the wireless power transmitter 100 can also transmit data to the wireless power receiver 200 in a similar manner as described above.

In other words, the power transmission control unit 112 may control the modulation/demodulation unit 113 such that data to be sent to the wireless power receiver 200 is loaded on the carrier signal 10a. In this case, the power receiving control unit 292 at the side of the wireless power receiver 200 may control the power communications modulation/demodulation unit 293 to acquire data from the to modulated carrier signal 10a.

Packet Format

Hereinafter, the structure of a packet used in communication using a wireless power signal according to the embodiments disclosed herein will be described.

Figure 12:
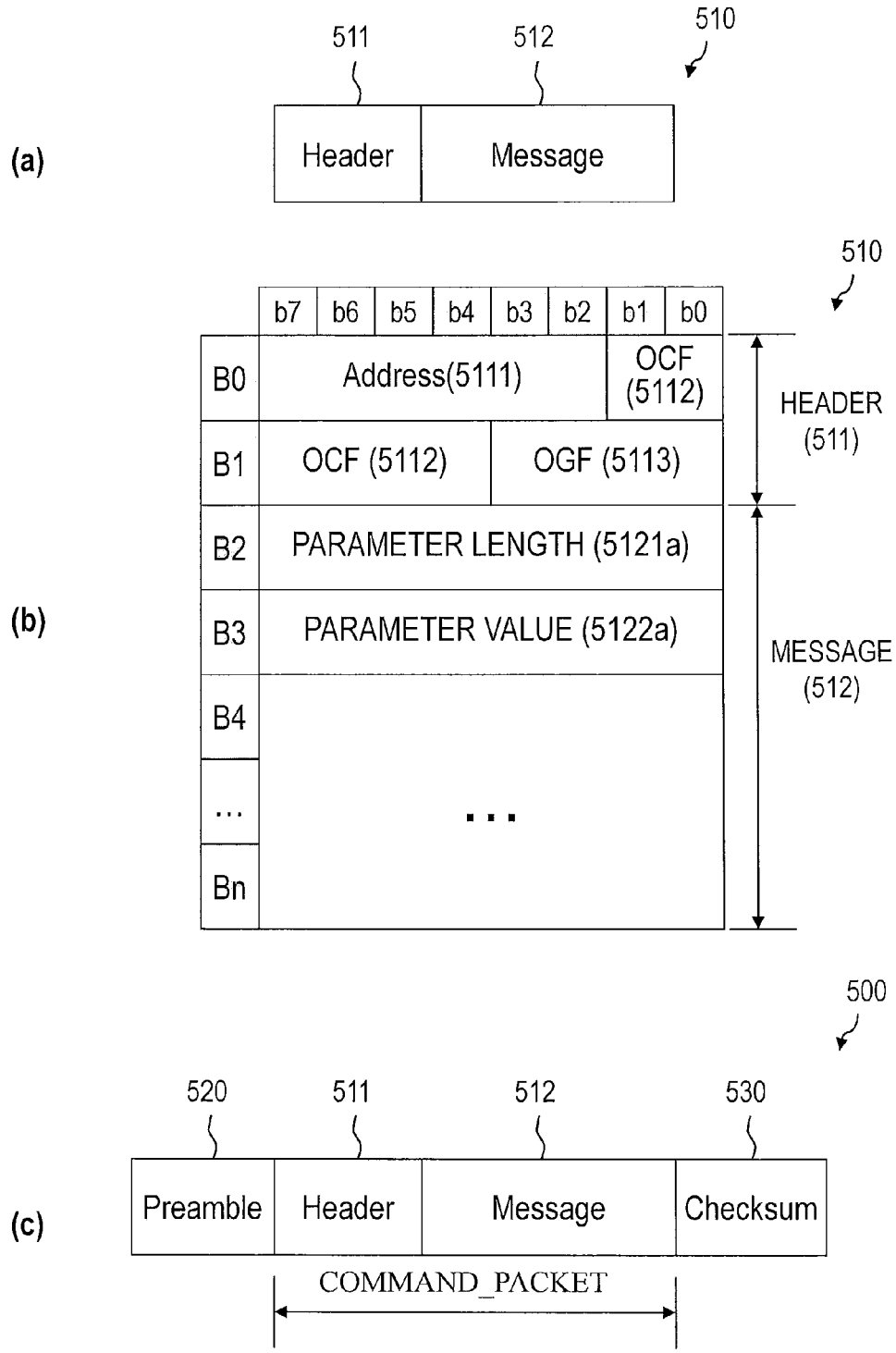
FIG. 12 is a view illustrating a packet including a power control message used in a contactless power transfer method according to the embodiments disclosed herein.

FIG. 12 is a view illustrating a packet including a power control message used in a contactless power transfer method according to the embodiments disclosed herein.

Referring to FIG. 12A, the wireless power transmitter 100 and the electronic device 200 may transmit and receive data desired to be transmitted in the form of a command packet 510. The command packet 510 may include a header 511 and a message 512.

The header 511 may include a field indicating the kind of data contained in the message 512. The size and kind of the message can be determined based on a value indicated by the field indicating the kind of data.

Furthermore, the header 511 may include an address field capable of identifying the sender of the packet. For instance, the address field may indicate an identifier of the electronic device 200 or an identifier of the group to which the electronic device 200 belongs. When the electronic device 200 desires to transmit the packet 510, the electronic device 200 may generate the packet 510, thereby allowing the address field of the packet 510 to indicate its own identification information.

The message 512 may include data desired to be transmitted by the sender of the packet 510. The data contained in the message 512 may be a report, a request or a response.

On the other hand, in some embodiments, the command packet 510 may be configured as illustrated in FIG. 12B. The header 511 contained in the command packet 510 may be expressed with a predetermined size. For instance, the header 511 may be the size of two bytes.

The header 511 may be configured to contain a receiver address field. For instance, the receiver address field may be the size of 6 bytes.

The header 511 may include an operation command field (OCF) or operation group field (OGF). The OGF is a value given for each group of commands for the electronic device 200, and the OCF is a value given for each command existing in each group containing the electronic device 200.

The message 512 may be expressed by dividing into a length field 5121 of the parameter and a value field 5122 of the parameter. In other words, the sender of the packet 510 may be configured in the form of one or more pairs of length-value of the parameters required to express data desired to transmit the message.

Referring to FIG. 12C, the wireless power transmitter 100 and the electronic device 200 may transmit and receive the data in the form of a packet in which the preamble 520 and checksum 530 for transmission are added to the command packet 510.

The preamble 520 may be used to perform synchronization with data received by the wireless power transmitter 100 and correctly detect the start bit of the command packet 510. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, the operation phases of the wireless power transmitter 100 and wireless power receiver 200 will be described.

Figure 13:
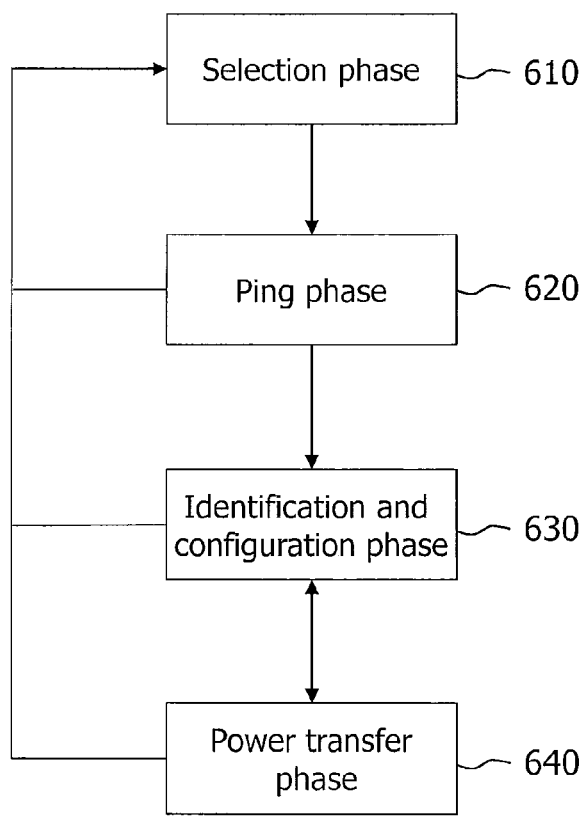
FIG. 13 is a view illustrating the operation phases of the wireless power transmitter 100 and wireless power receiver 200 according to the embodiments disclosed herein.

FIG. 13 illustrates the operation phases of the wireless power transmitter 100 and wireless power receiver 200 according to the embodiments disclosed herein. Furthermore, FIGS. 14 through 18 illustrate the structure of packets including a power control message between the wireless power transmitter 100 and wireless power receiver 200.

Referring to FIG. 13, the operation phases of the wireless power transmitter 100 and the wireless power receiver 200 for contactless power transfer may be divided into a selection state (or phase) 610, a Ping state (or phase) 620, an Identification and configuration state (or phase) 630, and a Power transfer state (or phase) 640.

The wireless power transmitter 100 detects whether or not objects exist within a range that the wireless power transmitter 100 can transmit power in a wireless manner in the selection state (or phase) 610, and the wireless power transmitter 100 sends a detection signal to the detected object and the wireless power receiver 200 sends a response to the detection signal in the Ping state (or phase) 620.

Furthermore, the wireless power transmitter 100 identifies the wireless power receiver 200 selected through the previous states and acquires configuration information for power transfer in the Identification and configuration state (or phase) 630. The wireless power transmitter 100 transmits power to the wireless power receiver 200 while controlling power transmitted in response to a control message received from the wireless power receiver 200 in the Power transfer state (or phase) 640.

Hereinafter, each of the operation phases will be described in detail.

1) Selection State (or Phase)

The wireless power transmitter 100 in the selection state (or phase) 610 performs a detection process to select the wireless power receiver 200 existing within a detection area. The detection area, as described above, refers to a region in which an object within the relevant area can affect on the characteristic of the power of the power conversion unit 111. Compared to the Ping state (or phase) 620, the detection process for selecting the wireless power receiver 200 in the selection state (or phase) 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection state (or phase) 610 may be referred to as an analog ping process in the aspect of detecting an object using a wireless power signal without using a packet in a digital format in the Ping state (or phase) 620 which will be described later.

The wireless power transmitter 100 in the selection state (or phase) 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection state (or phase) 610 may be different from one another.

First, in case where power is transmitted according to the inductive coupling method, the wireless power transmitter 100 in the selection state (or phase) 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the Ping state (or phase) 620 in the selection state (or phase) 610, and checking whether or not a response to the detection signal is transmitted from the object using each coil in the Ping state (or phase) 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection state (or phase) 610 can detect an object by detecting that any one of a frequency, a current and a voltage of the power conversion unit is changed due to an object located within the detection area.

On the other hand, the wireless power transmitter 100 in the selection state (or phase) 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection state (or phase) 610 and a wireless power signal formed to perform digital detection, identification, configuration and power transmission in the subsequent states 620, 630, 640 may have a different characteristic in the frequency, strength, and the like. It is because the selection state (or phase) 610 of the wireless power transmitter 100 corresponds to an idle phase for detecting an object, thereby allowing the wireless power transmitter 100 to reduce consumption power in the idle state or generate a specialized signal for effectively detecting an object.

2) Ping State (or Phase)

The wireless power transmitter 100 in the Ping state (or phase) 620 performs a process of detecting the wireless power receiver 200 existing within the detection area through a power control message. Compared to the detection process of the wireless power receiver 200 using a characteristic of the wireless power signal and the like in the selection state (or phase) 610, the detection process in the Ping state (or phase) 620 may be referred to as a digital ping process.

The wireless power transmitter 100 in the Ping state (or phase) 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allow the wireless power transmitter 100 in the Ping state (or phase) 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

Figure 14:
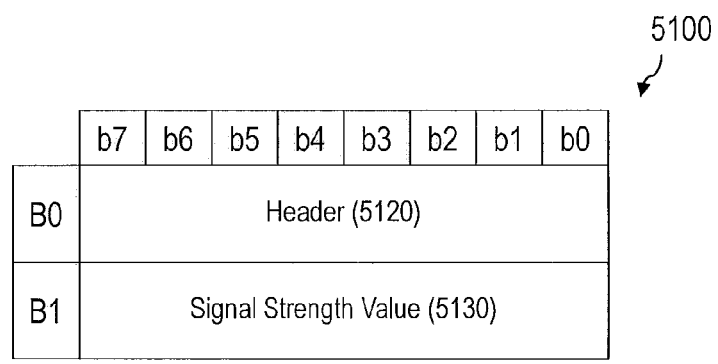
FIGS. 14 through 18 are views illustrating the structure of packets including a power control message between the wireless power transmitter 100 and wireless power receiver 200.

On the other hand, the power control message corresponding to a response to the detection signal may be a message indicating a strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating a strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the Identification and configuration state (or phase) 630. In other words, the wireless power transmitter 100 maintains the power signal at a specific operating point subsequent to finding the wireless power receiver 200 to receive a power control message required in the Identification and configuration state (or phase) 630.

However, if the wireless power transmitter 100 is not able to find the wireless power receiver 200 to which power can be transferred, then the operation phase of the wireless power transmitter 100 will be returned to the selection state (or phase) 610.

3) Identification and Configuration State (or Phase)

The wireless power transmitter 100 in the Identification and configuration state (or phase) 630 may receive identification information and/or configuration information transmitted by the wireless power receiver 200, thereby controlling power transfer to be effectively carried out.

Figure 15A:
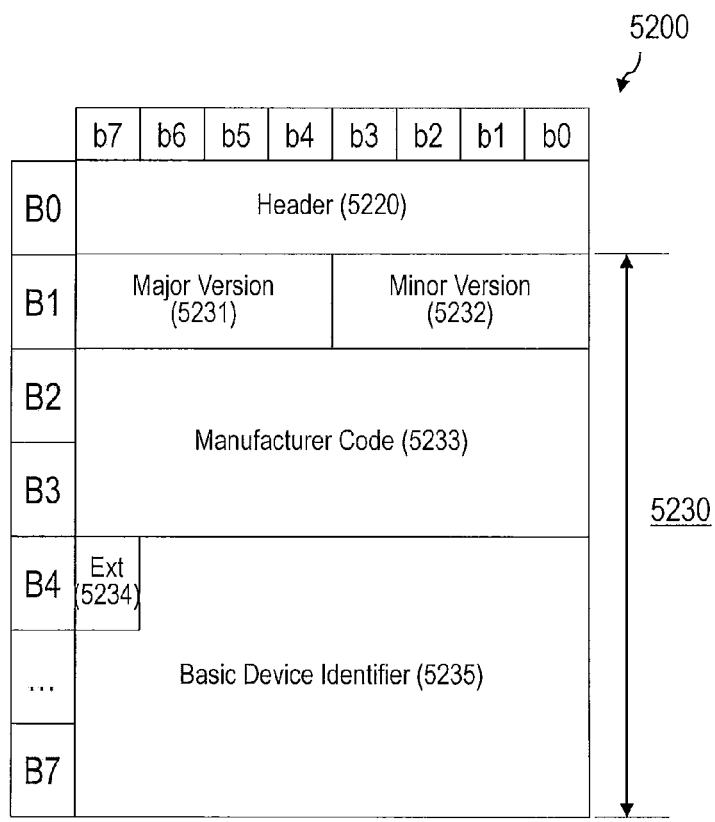
Figure 15B:
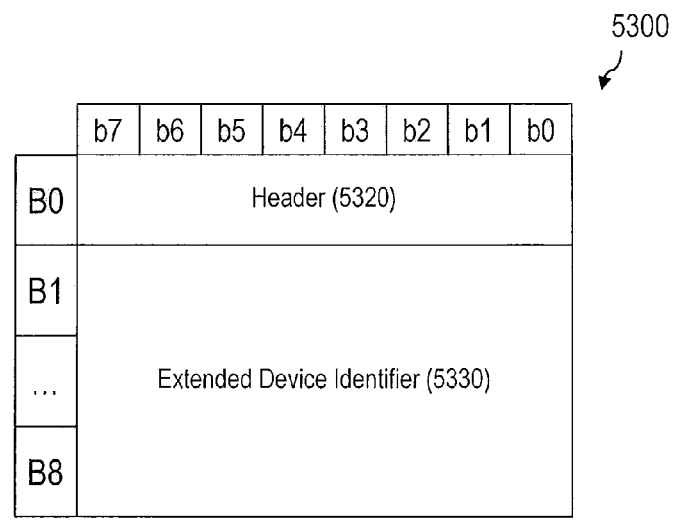

The wireless power receiver 200 in the Identification and configuration state (or phase) 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the wireless power receiver. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

Figure 16:
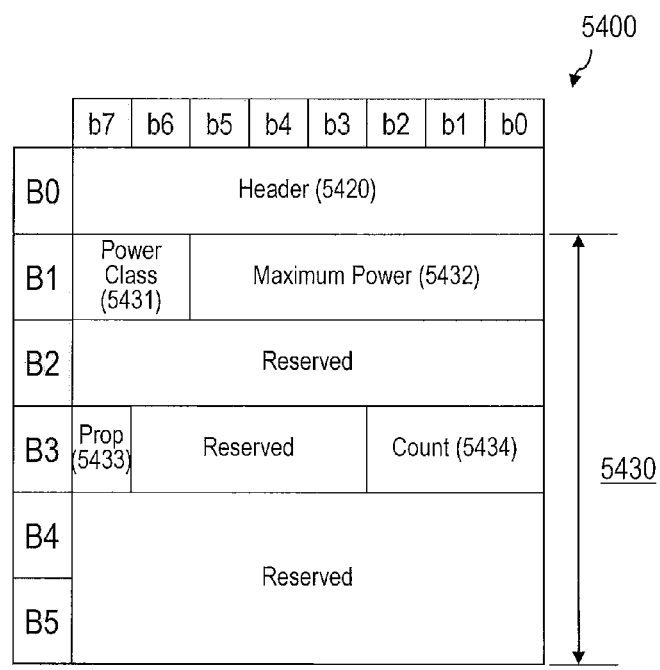

The wireless power receiver 200 may transmit a power control message including information on expected maximum power in the Identification and configuration state (or phase) 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for contactless power transfer.

On the other hand, the wireless power transmitter 100 may generate a power transfer contract which is used for power charging with the wireless power receiver 200 based on the identification information and/or configuration information.

The power transfer contract may include the limits of parameters determining a power transfer characteristic in the Power transfer state (or phase) 640.

The wireless power transmitter 100 may terminate the Identification and configuration state (or phase) 630 and return to the selection state (or phase) 610 prior to entering the Power transfer state (or phase) 640. For instance, the wireless power transmitter 100 may terminate the Identification and configuration state (or phase) 630 to find another wireless power receiver that can receive power in a wireless manner.

4) Power Transfer State (or Phase)

The wireless power transmitter 100 in the Power transfer state (or phase) 640 transmits power to the wireless power receiver 200.

Figure 17:
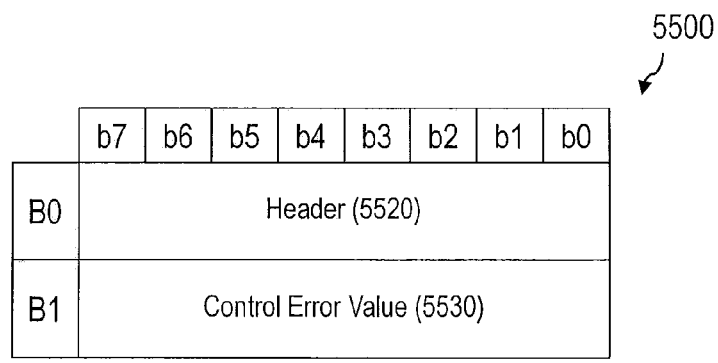

The wireless power transmitter 100 may receive a power control message from the wireless power receiver 200 while transmitting power, and control a characteristic of the power applied to the transmitting coil in response to the received power control message. For example, the power control message used to control a characteristic of the power applied to the transmitting coil may be included in a control error packet 5500 as illustrated in FIG. 17. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0", reduced if the control error value is a negative value, and increased if the control error value is a positive value.

The wireless power transmitter 100 may monitor parameters within a power transfer contract generated based on the identification information and/or configuration information in the Power transfer state (or phase) 640. As a result of monitoring the parameters, if power transmission to the wireless power receiver 200 violates the limits included in the power transfer contract, then the wireless power transmitter 100 may cancel the power transmission and return to the selection state (or phase) 610.

The wireless power transmitter 100 may terminate the Power transfer state (or phase) 640 based on a power control message transferred from the wireless power receiver 200.

For example, if the charging of a battery has been completed while charging the battery using power transferred by the wireless power receiver 200, then a power control message for requesting the suspension of contactless power transfer will be transferred to the wireless power transmitter 100. In this case, the wireless power transmitter 100 may receive a message for requesting the suspension of the power transmission, and then terminate contactless power transfer, and return to the selection state (or phase) 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the Identification and configuration state (or phase) 630.

Figure 18:
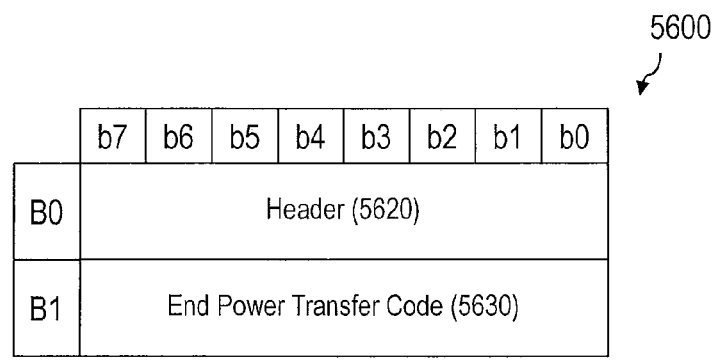

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of a Plurality of Electronic Devices

Hereinafter, a method in which one or more electronic devices perform communication using a wireless power signal from one wireless power transmitter will be described.

Figure 19:
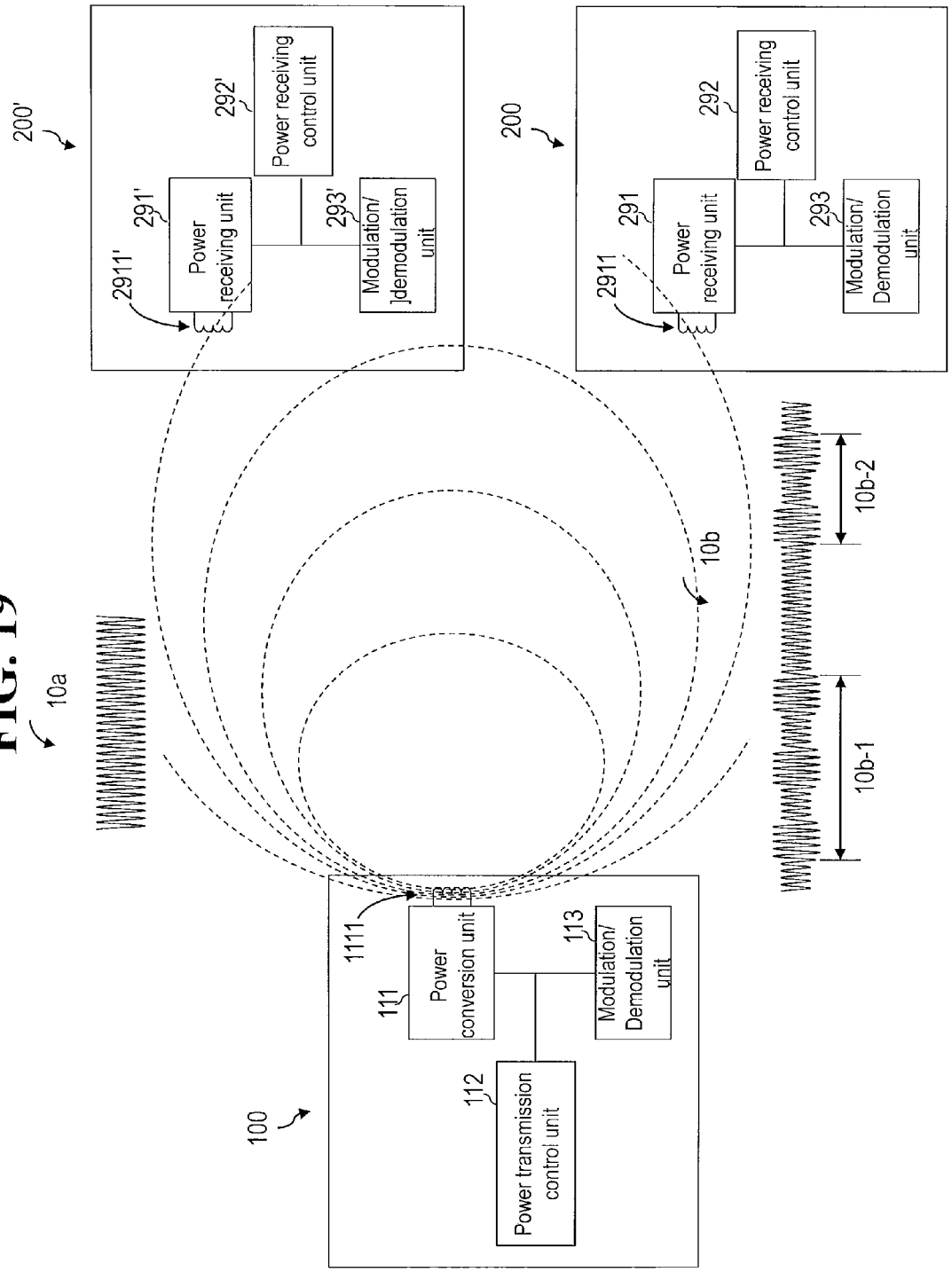
FIG. 19 is a conceptual view illustrating a method in which a wireless power transmitter transfers power to one or more wireless power receivers.

FIG. 19 is a conceptual view illustrating a method in which a wireless power transmitter transfers power to one or more wireless power receivers.

The wireless power transmitter 100 may transfer power for one or more wireless power receivers 200, 200'. In FIG. 19, two electronic devices 200, 200' are illustrated, but the foregoing method according to the embodiments disclosed herein will not be limited to the number of electronic devices illustrated herein.

The active region and detection region are different according to a wireless power transfer scheme of the wireless power transmitter 100. Accordingly, the wireless power transmitter 100 may determine whether there exists a wireless power receiver disposed in the active region or detection region of the resonant coupling method or whether there exists a wireless power receiver disposed in the active region or detection region of the inductive coupling method. According to a result of the determination, the wireless power transmitter 100 supporting each wireless power transfer scheme may change the power transfer scheme for each wireless power receiver.

According to wireless power transfer according to the embodiments disclosed herein, when the wireless power transmitter 100 transfers power for one or more electronic devices 200, 200' with the same wireless power transfer scheme, communication may be carried out through the wireless power signal without being collided with each other.

As illustrated in FIG. 19, the wireless power signal 10a formed by the wireless power transmitter 100 arrives at a first electronic device 200' and a second electronic device 200. The first electronic device 200' and second electronic device 200 may transmit a power control message using the formed wireless power signal.

The first electronic device 200' and second electronic device 200 are operated as power receivers for receiving a wireless power signal. The power receiver according to the embodiments disclosed herein may include a power receiving unit 291', 291 for receiving the formed wireless power signal; a modulation/demodulation unit 293', 293 for performing modulation and demodulation for the received wireless power signal; and a controller 292', 292' for controlling each constituent elements of the power receiver.

[In Case of Supporting In-Band Two-Way Communication]

Hereinafter, a method of recognizing a wireless power receiver using two-way communication in wireless power transfer according to the embodiments disclosed herein will be described.

Structural Drawings of TX-RX Duplex (Handshaking) Communication

Figure 20A:
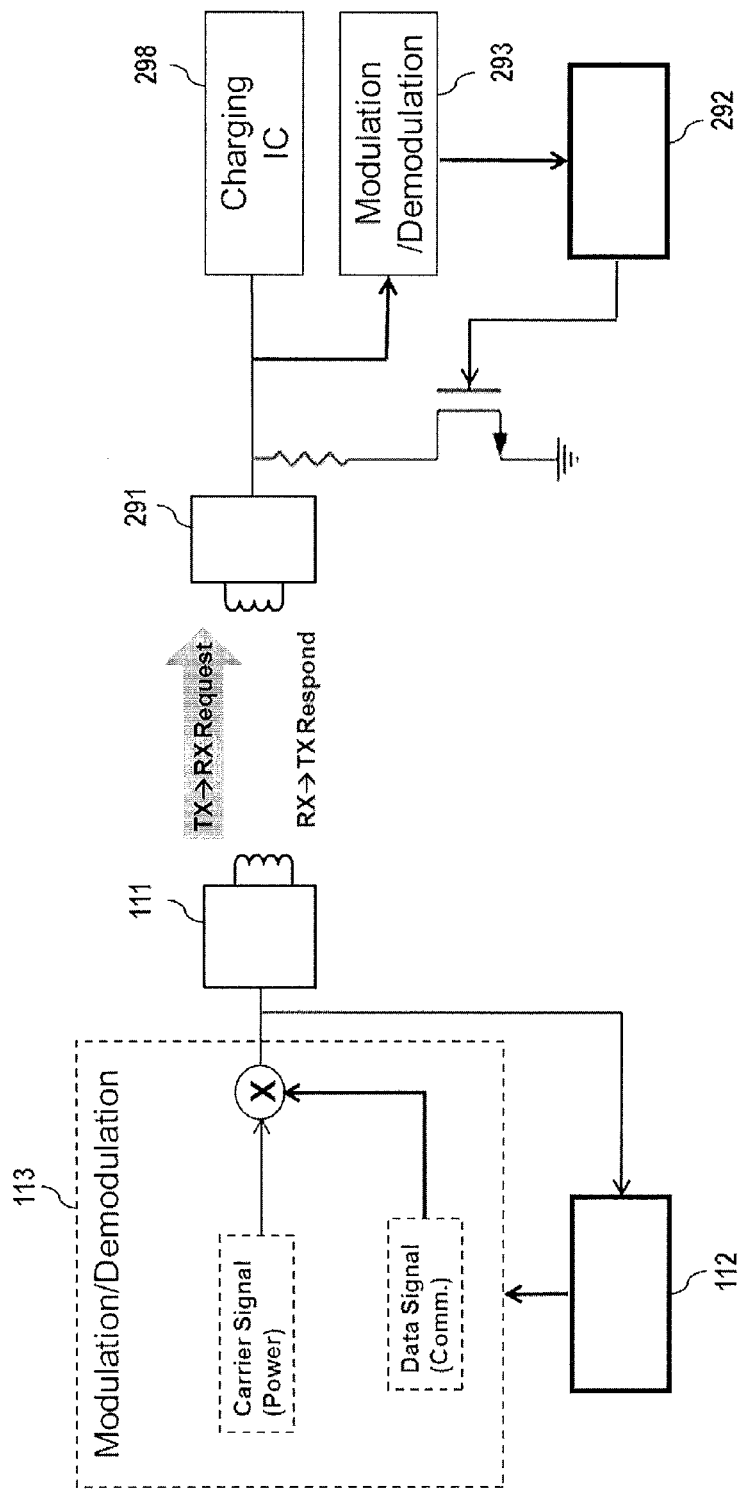
FIGS. 20A through 20C are conceptual views illustrating a two-way communication process between a wireless power transmitter 100 and one or more wireless power receivers 200 according to an embodiment disclosed herein.
Figure 20B:
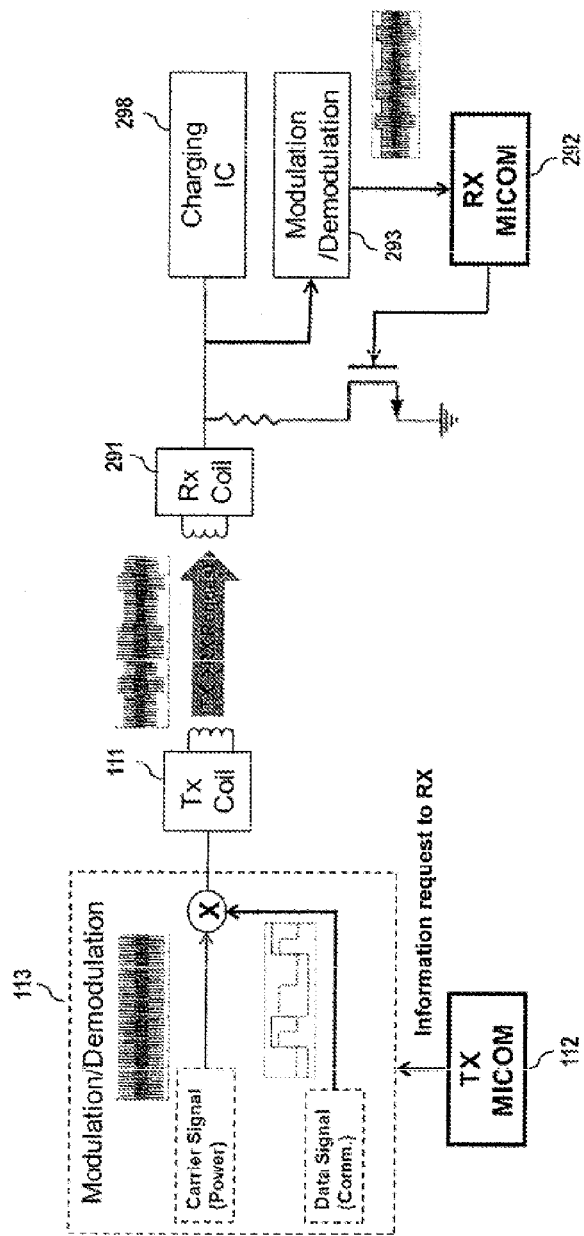
Figure 20C:
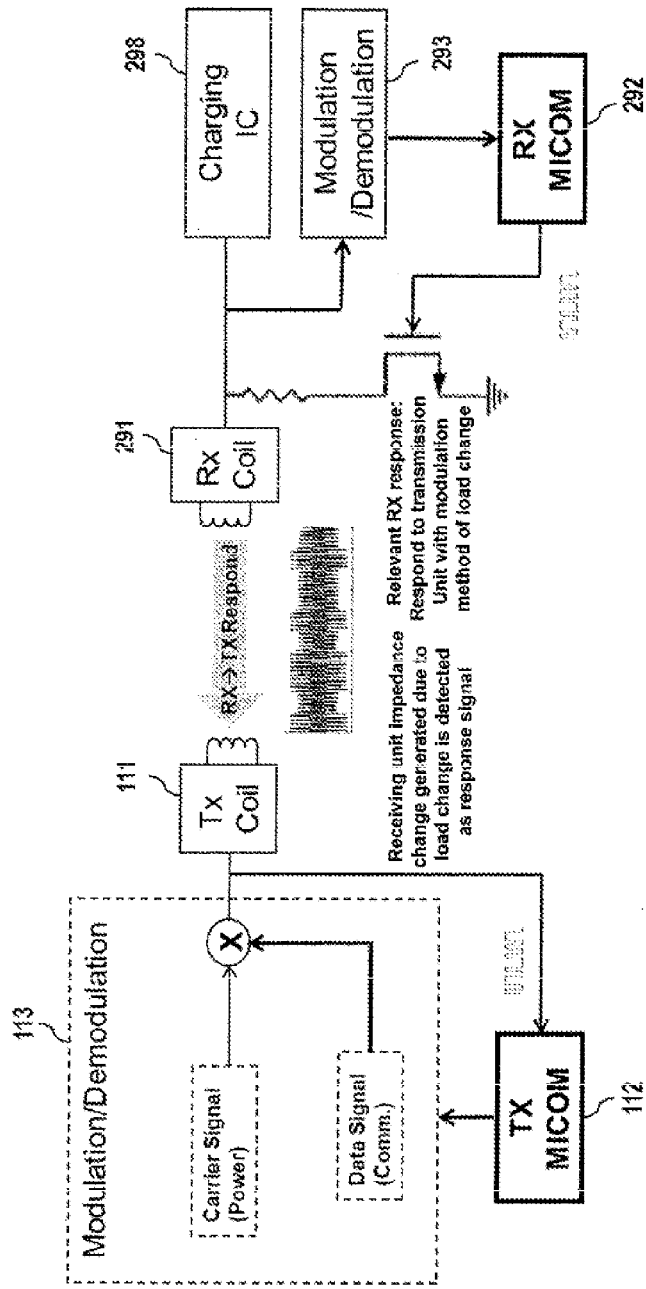

FIGS. 20A through 20C are conceptual views illustrating a two-way communication process between a wireless power transmitter 100 and one or more wireless power receivers 200 according to an embodiment disclosed herein.

Referring to FIGS. 20A through 20C, the wireless power transmitter 100 transmits a request message to the wireless power receiver 200. For example, the power transmission control unit 112 generates a packet containing a request message for the wireless power receiver 200, and the modulation/demodulation unit 113 modulates a wireless power signal to contain the generated packet, and the power conversion unit 111 transmits the modulated wireless power signal to the wireless power receiver 200. Furthermore, the power receiving unit 291 receives a wireless power signal from the wireless power transmitter 100, and the modulation/demodulation unit 293 demodulates a packet from the received wireless power signal, and the power receiving control unit 292 may acquire a request message contained in the packet.

The power receiving control unit 292 transmits a response message to the wireless power transmitter 100 within a predetermined period of time after receiving a request message (responds to the transmitting unit with a modulation method of load change). For example, the power receiving control unit 292 generates a packet containing a response message to the wireless power transmitter 100, and the modulation/demodulation unit 293 modulates a wireless power signal to contain the generated packet, and the power receiving unit 291 transmits the modulated wireless power signal to the wireless power transmitter 100. Furthermore, the power receiving unit 291 receives a wireless power signal from the wireless power receiver 200, and the modulation/demodulation unit 113 modulates a packet from the received wireless power signal, and the power transmission control unit 112 may acquire a response message contained in the packet (detects an impedance change of the receiving unit generated by a load change with a response signal).

When the identification information of a specific wireless power receiver, for example, address, is contained in the request message, only the wireless power receivers corresponding to the relevant identification information may transmit a response message to the wireless power transmitter 100 in response to the request message of the wireless power transmitter 100.

Furthermore, communication may be carried out using a method of transmitting and receiving a message on one communication line between the wireless power transmitter 100 and the wireless power receiver 200.

First Embodiment

Hereinafter, a method of recognizing an initial wireless power receiver in two-way communication of wireless power transfer according to a first embodiment disclosed herein will be described.

FIGS. 21A through 21G are conceptual views illustrating a process in which a wireless power transmitter 100 recognizes a wireless power receiver 200 at the initial stage in wireless power transfer supporting two-way communication.

Figure 21A:
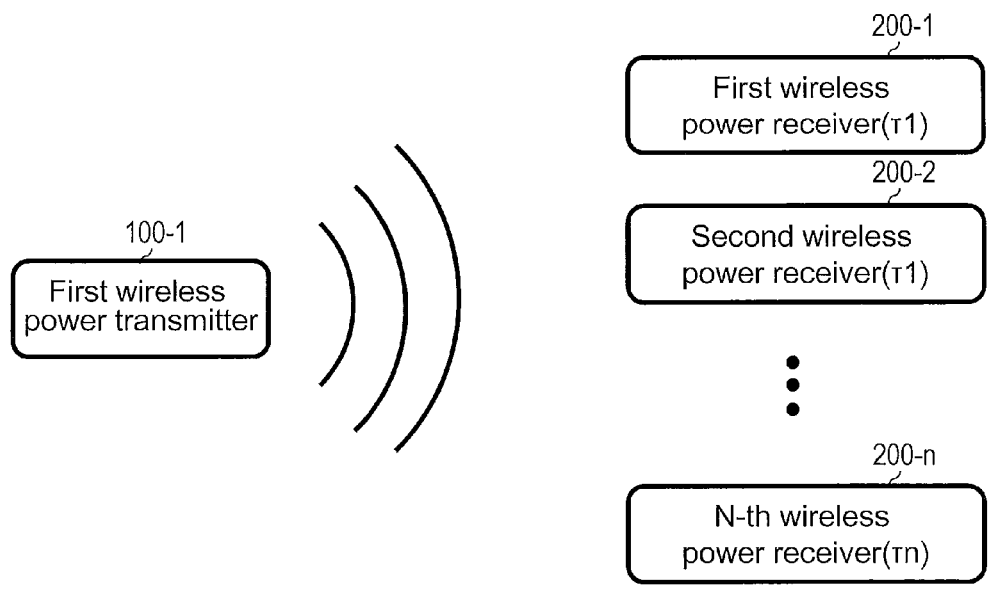
FIGS. 21A through 21G are conceptual views illustrating a process in which a wireless power transmitter 100 recognizes a wireless power receiver 200 at the initial stage in wireless power transfer supporting two-way communication.

Referring to FIG. 21A, a RX detection phase is carried out. The wireless power transmitter 100 transmits detection power to a plurality of wireless power receivers 200-1 to 200-n, thereby allowing the wireless power receivers 200-1 to 200-n to be switched from a sleep mode to an operating mode (wake-up). When transmitting detection power, the wireless power transmitter 100 requests the identification information (ID) of each wireless power receiver (ID request).

Figure 21B:
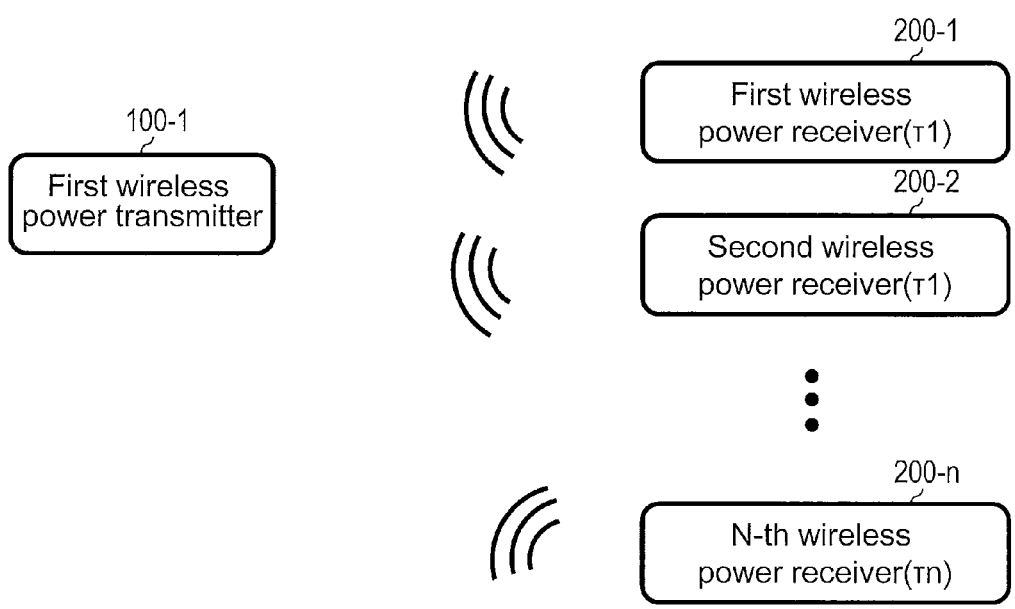
Figure 21C:
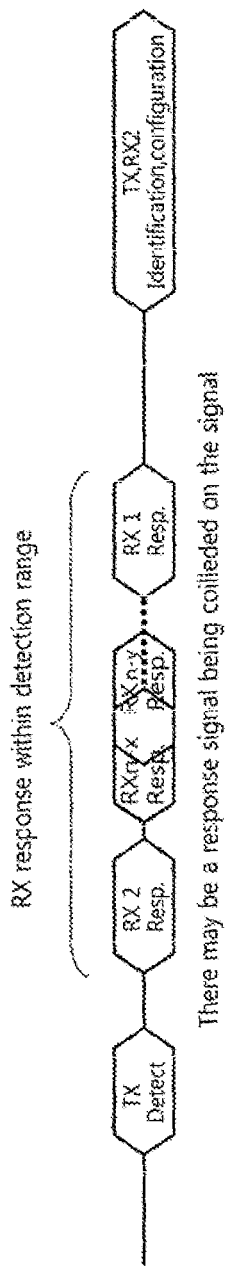

Referring to FIGS. 21B and 21C, a RX response phase is carried out. A plurality of wireless power receivers 200-1 to 200-n switched to an operating mode by the wireless power transmitter 100 responds to the wireless power transmitter 100 based on their own individual delay times. In other words, the first wireless power receiver 200-1 through the n-th wireless power receiver 200-n time-divide a response delay time based on each random number subsequent to device start or operating mode start (ID respond).

In particular, referring to FIG. 21C, when the wireless power receivers 200-1 to 200-n located within a detection range respond to a request of the wireless power transmitter 100, a collided response signal may exist on the signal according to each random number.

Figure 21D:
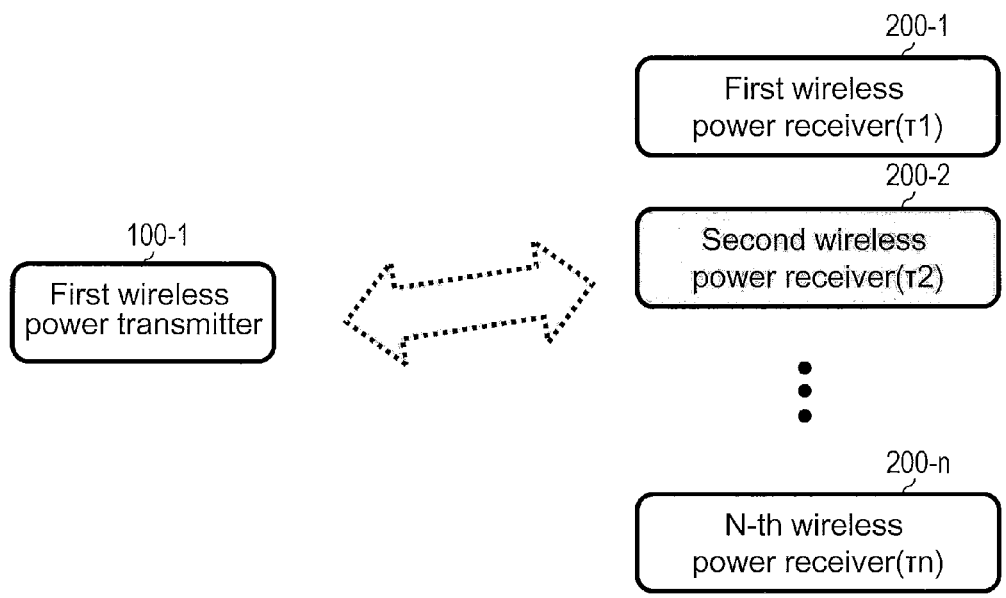

Referring to FIG. 21D, a TX/RX register phase is carried out. The wireless power transmitter 100 performs an authentication process for a valid signal (a signal capable of acquiring the identification information of the wireless power receiver 200) among the signals sent from the wireless power receivers 200-1 to 200-n, and then registers it with the wireless power transmitter 100. Then, the registered wireless power receiver 200-2 is switched to a sleep mode, thereby not allowing to respond when identification information is requested again to the wireless power receivers 200-1 to 200-n.

Figure 21E:
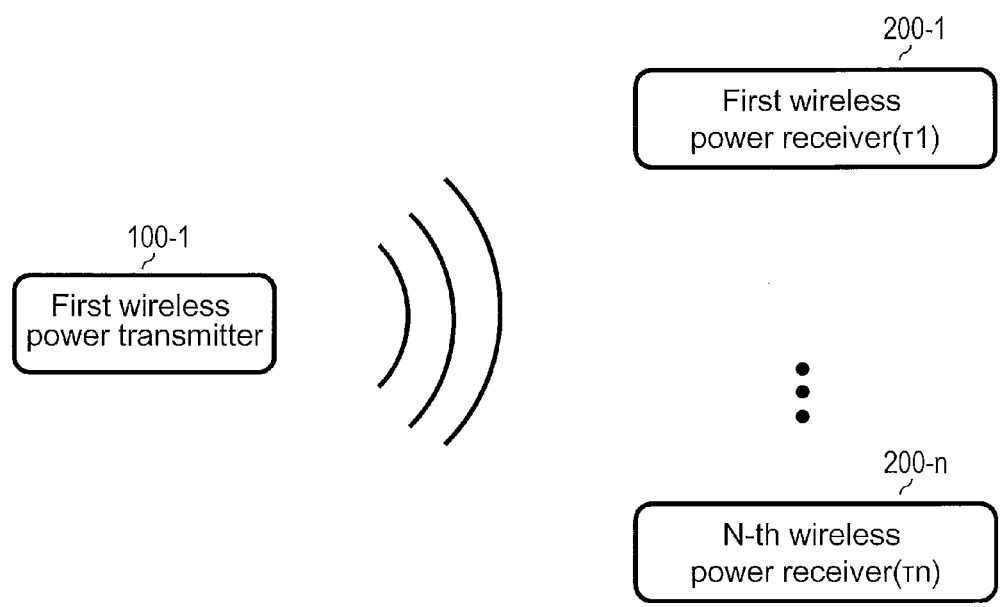

Referring to FIG. 21E, a RX re-detection phase is carried out. The wireless power transmitter 100 transmits wireless power for requesting identification information again to a plurality of wireless power receivers 200-1 to 200-n to detect the remaining wireless power receivers, namely, non-registered wireless power receivers 200-1, 200-n.

Figure 21F:
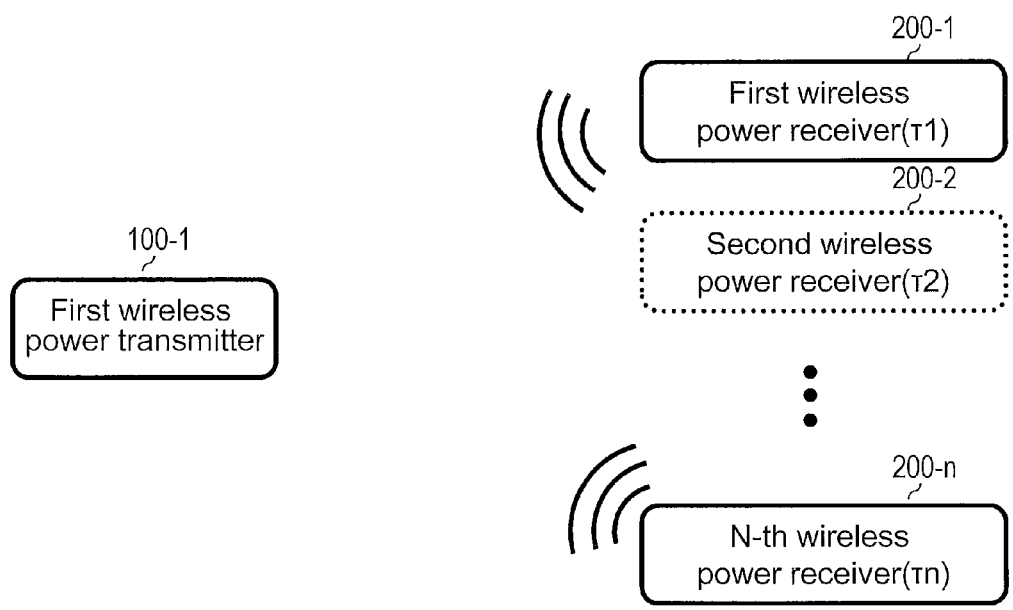

Referring to FIG. 21F, a RX re-respond phase is carried out. Excluding the wireless power receiver 200-2 switched to a sleep mode (a wireless power receiver registered with the wireless power transmitter 100), they respond based on their own individual delay times. In other words, the first wireless power receiver 200-1 through the n-th wireless power receiver 200-n time-divide a response delay time based on each random number subsequent to device start or operating mode start (ID respond).

Figure 21G:
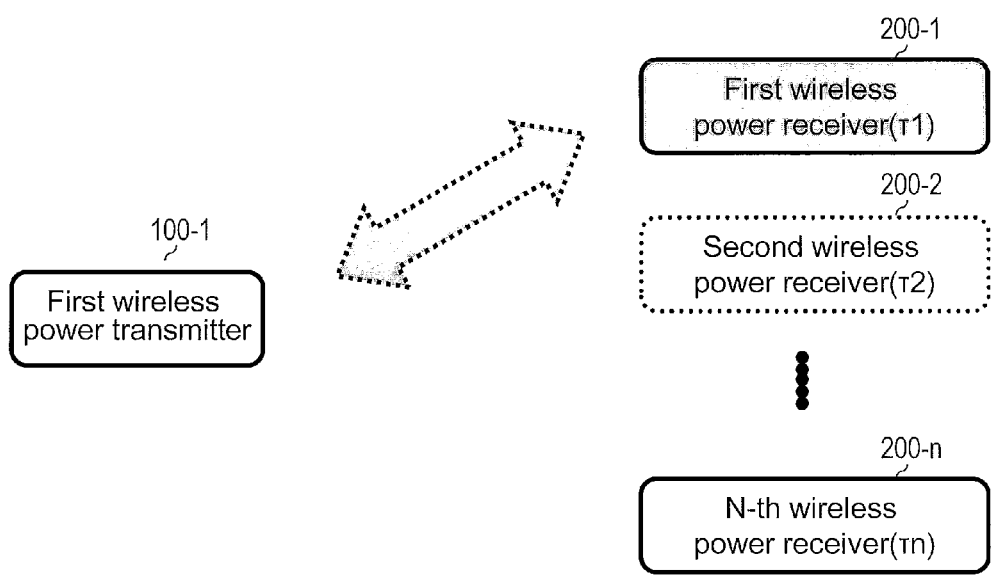

Referring to FIG. 21G, a TK/RK register phase is carried out. The wireless power transmitter 100 performs an authentication process for a valid signal (acquired identification information) among the signals sent from the wireless power receivers 200-1 to 200-n, and then registers it with the wireless power transmitter 100. Then, the registered wireless power receiver 200-1 is switched to a sleep mode, thereby not allowing to respond when identification information is requested. When there is no response even when identification information is requested to the wireless power receivers 200-1 to 200-n, the wireless power transmitter 100 is changed from a detection phase to a power transfer phase, thereby performing communication using a handshaking scheme with the wireless power receiver 200 based on each identification information.

Figure 22:
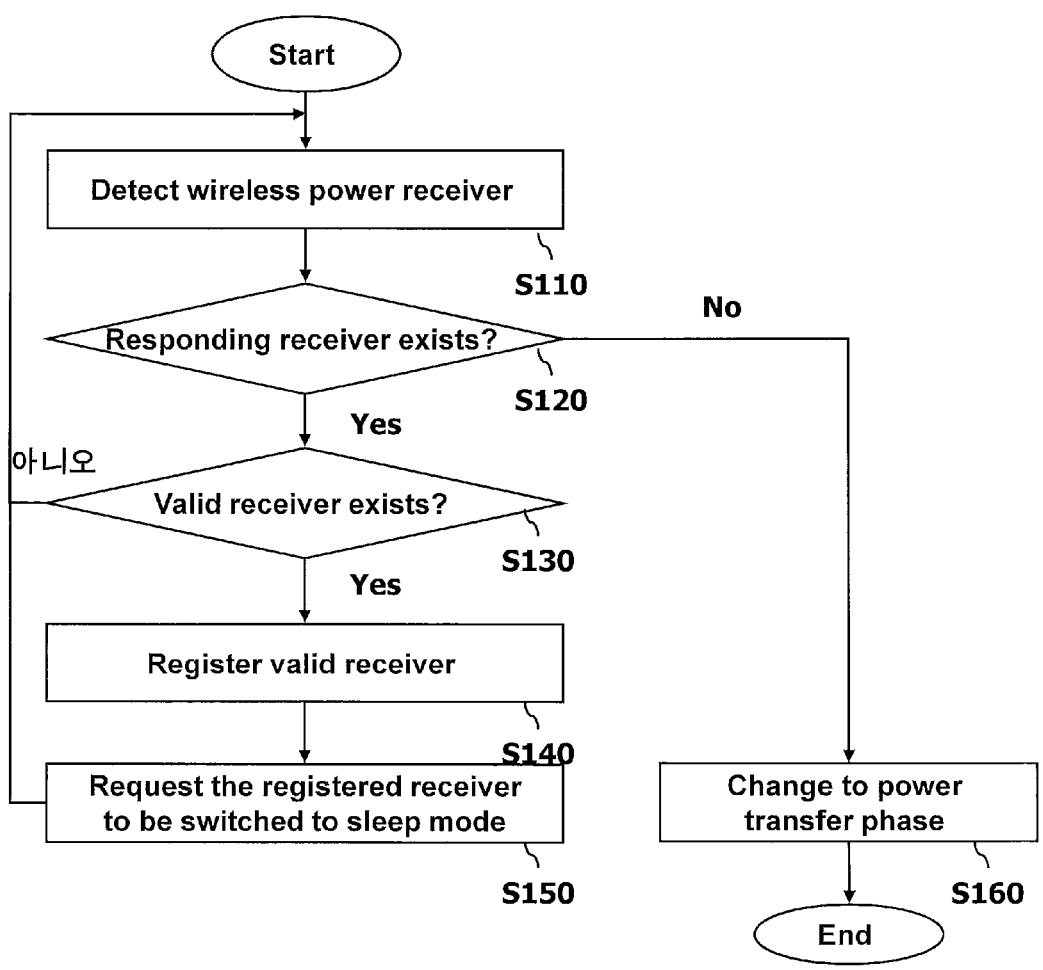
FIG. 22 is a flow chart illustrating a process in which a wireless power transmitter 100 recognizes a wireless power receiver 200 at the initial stage in wireless power transfer supporting two-way communication.

FIG. 22 is a flow chart illustrating a process in which a wireless power transmitter 100 recognizes a wireless power receiver 200 at the initial stage in wireless power transfer supporting two-way communication.

The wireless power transmitter 100 requests identification information (or address) to the wireless power receiver 200 (S110), and performs a register phase for valid (not being collided, signal can be received at the wireless power receiver 200) wireless power receivers 200 (S120 to S140). In other words, the wireless power transmitter 100 determines whether there exists any responding wireless power receiver 200 (S120), determines whether there exists any valid wireless power receiver 200 when there exists any responding wireless power receiver 200 (S130), and registers the relevant wireless power receiver 200 with the wireless power transmitter 100 when there exists any valid wireless power receiver 200 (S150).

A sleep mode change is requested for the registered wireless power receiver 200 (S150), and the wireless power transmitter 100 requests identification information (address) again for the remaining (non-registered) wireless power receiver 200.

During the identification information request, the wireless power receivers 200 send information to the wireless power transmitter 100 to be time-divided by their own random numbers, respectively, and a register phase is carried out in the wireless power transmitter 100 for a signal of the wireless power receiver 200 that has not been collapsed.

When detection for all wireless power receivers 200 has been completed (when there is no more response to a detection request of the wireless power transmitter 100), power transfer communication is carried out based on the registered wireless power receiver address (S160).

Figure 23:
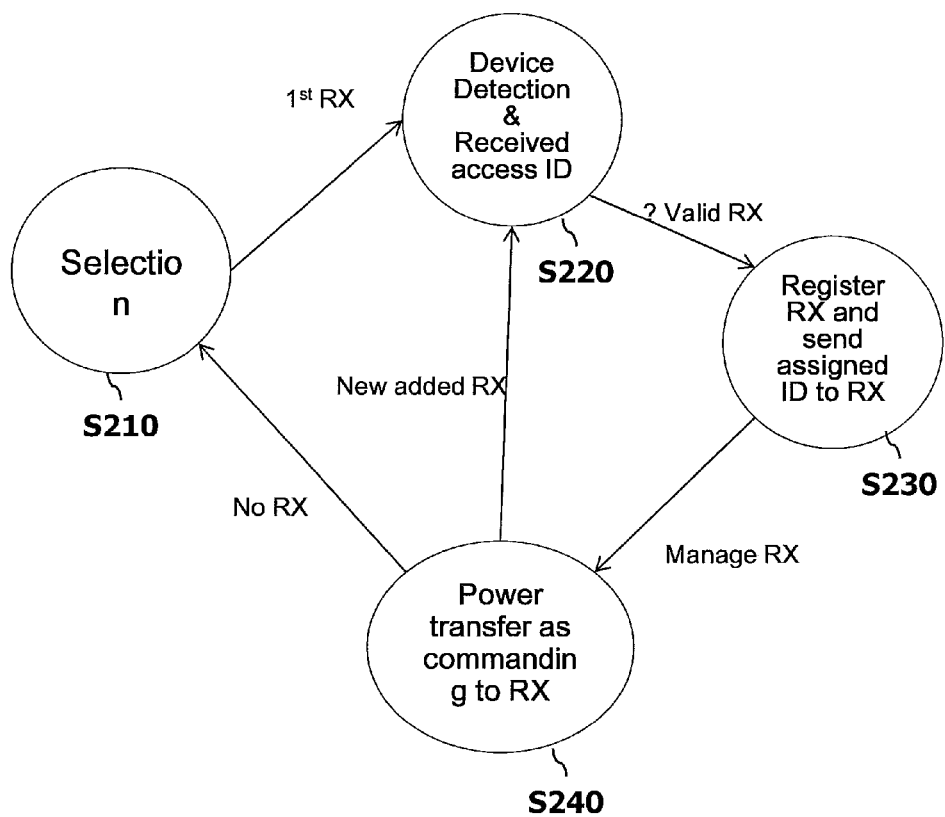
FIG. 23 is a view illustrating the phase change of a wireless power transmitter 100 during a process in which the wireless power transmitter 100 recognizes a wireless power receiver 200 at the initial stage in wireless power transfer supporting two-way communication.

FIG. 23 is a view illustrating the phase change of a wireless power transmitter 100 during a process in which the wireless power transmitter 100 recognizes a wireless power receiver 200 at the initial stage in wireless power transfer supporting two-way communication.

The wireless power transmitter 100 detects the wireless power receiver 200 at the initial stage in a selection state (or phase) (S210) and requests identification information to receive the identification information from the wireless power receiver 200 (S220). When there exists any valid wireless power receiver 200, the wireless power transmitter 100 registers the relevant wireless power receiver 200, and transmits the assigned ID to the wireless power receiver 200 (S230). At this time, the wireless power transmitter 100 manages the wireless power receiver 200, and perform power transfer communication with the wireless power receiver 200 (S240). When a new wireless power receiver 200 is added thereto, the wireless power transmitter 100 is switched to the step S220. However, when there does not exist a new wireless power receiver 200, the wireless power transmitter 100 is switched to the step S210.

Figure 24:
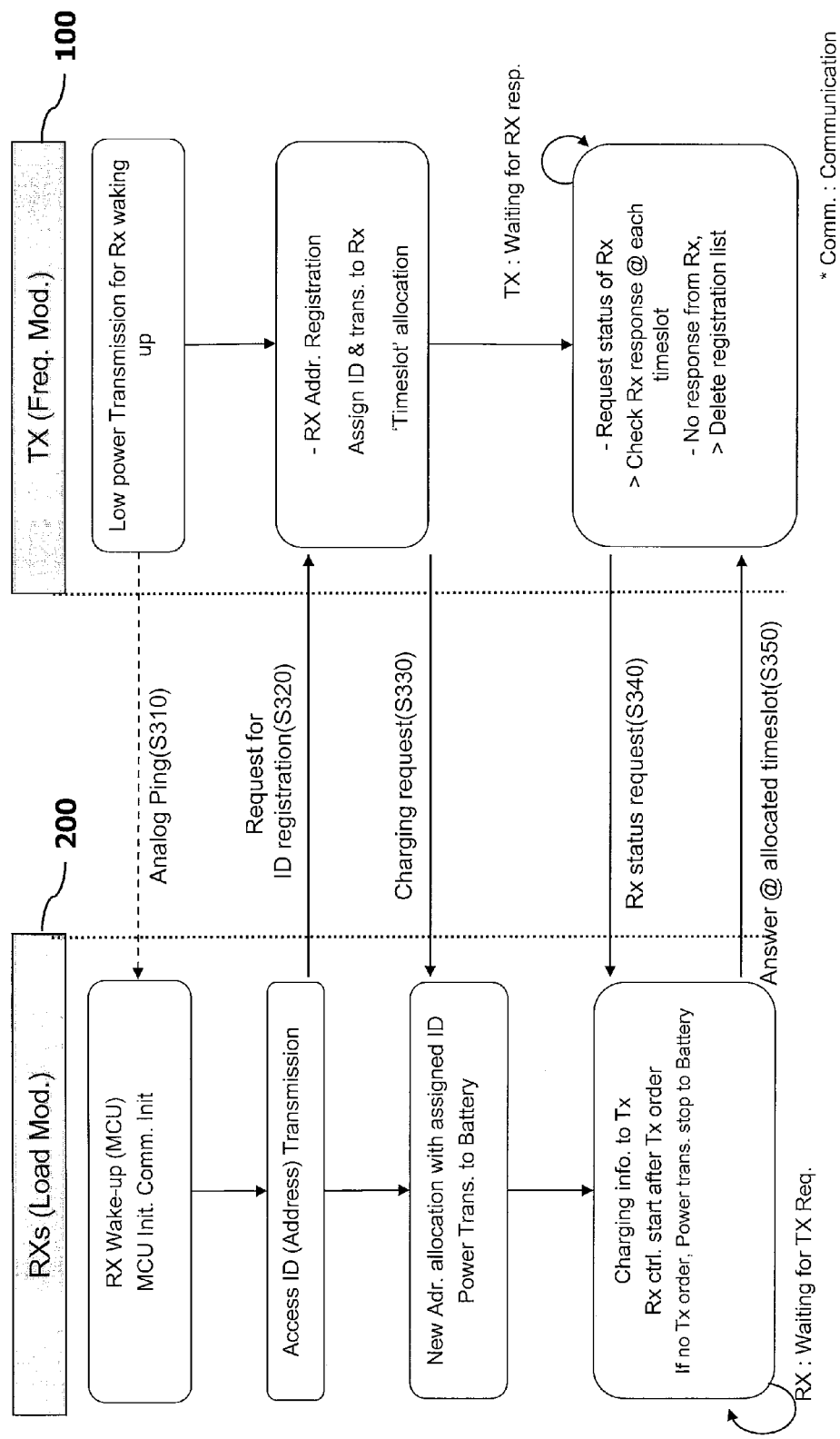
FIG. 24 is a view illustrating an operation process between a wireless power transmitter 100 and a wireless power receiver 200 during a process in which the wireless power transmitter 100 recognizes a wireless power receiver 200 at the initial stage in wireless power transfer supporting two-way communication.

FIG. 24 is a view illustrating an operation process between a wireless power transmitter 100 and a wireless power receiver 200 during a process in which the wireless power transmitter 100 recognizes a wireless power receiver 200 at the initial stage in wireless power transfer supporting two-way communication.

The wireless power transmitter 100 performs low power transfer for waking up the wireless power receiver 200 to an operating mode. In other words, analog ping is transferred from the wireless power transmitter 100 to the wireless power receiver 200, and switched to an operating mode, and thus the control unit (MCU) is switched to an operating mode to initialize communication (S310).

Accordingly, the wireless power receiver 200 transmits approach identification information (address) to the wireless power transmitter 100. In other words, a register request message is transferred from the wireless power receiver 200 to the wireless power transmitter 100, and the wireless power transmitter 100 registers an address of the wireless power receiver 200, assigns ID, and assigns a time slot (S320) to transmit it to the wireless power receiver 200. A charge request message is transmitted from the wireless power transmitter 100 to the wireless power receiver 200. The wireless power receiver 200 assigns a new address with the assigned ID, and transfers power to the charger 298 (S330).

The wireless power transmitter 100 requests a status of the wireless power receiver 200 (S340), and checks a response from the wireless power receiver 200 at each time slot (waits for a response). The wireless power receiver 200 responds at each assigned time slot (S350).

The wireless power receiver 200 transmits charging information to the wireless power transmitter 100. The wireless power receiver 200 starts the control of wireless power reception subsequent to a command of the wireless power transmitter 100. If there is no command from the wireless power transmitter 100, then the wireless power receiver 200 suspends power transfer to the charger 298.

If there is not response from the wireless power receiver 200, then the wireless power transmitter 100 deletes the relevant wireless power receiver 200 from a registration list.

FIGS. 25A through 25D are conceptual views illustrating a process in which a wireless power transmitter 100 and a wireless power receiver 200 perform a request and response operation on various conditions in wireless power transfer supporting two-way communication.

Figure 25A:
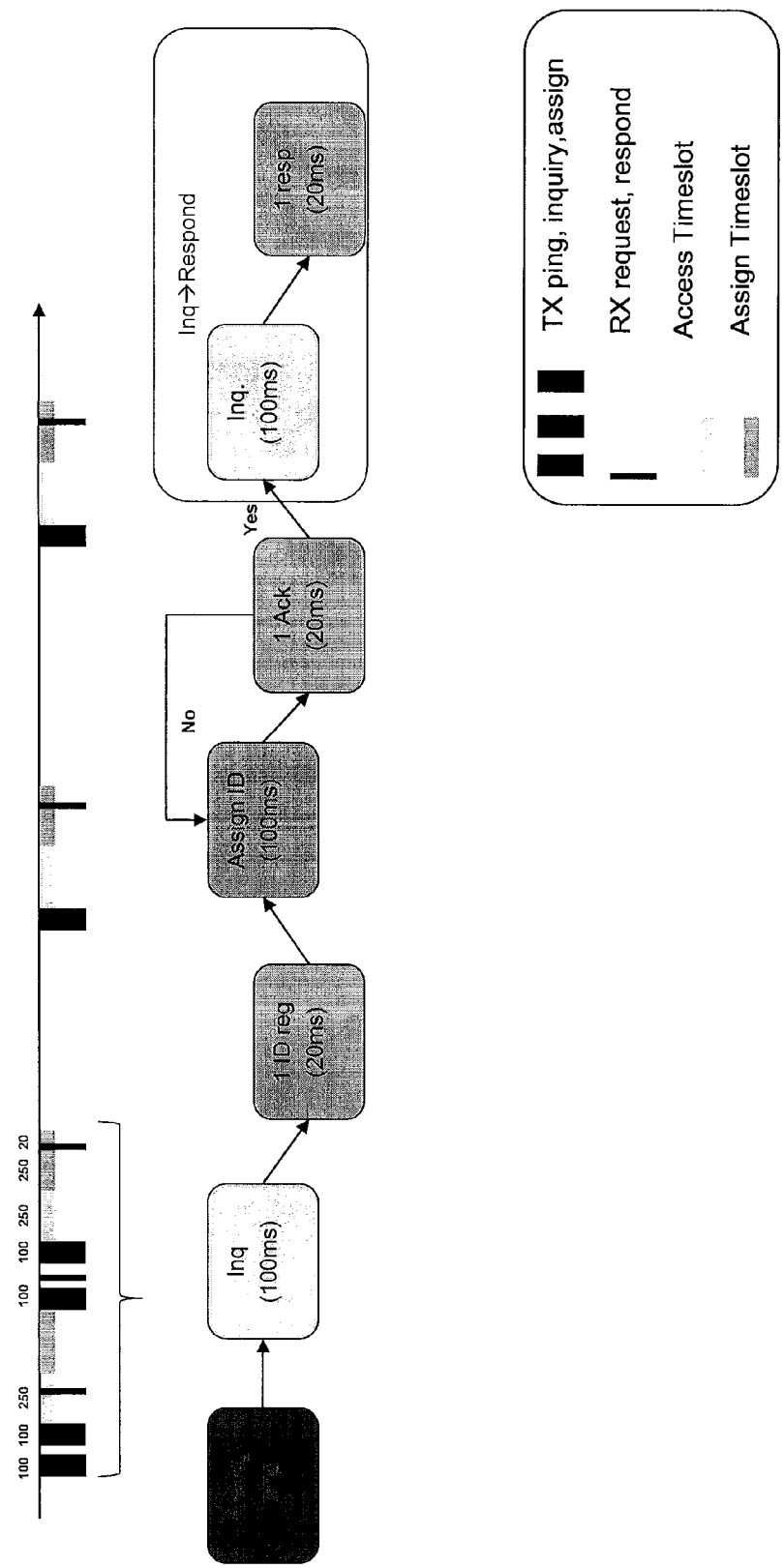
FIGS. 25A through 25D are conceptual views illustrating a process in which a wireless power transmitter 100 and a wireless power receiver 200 perform a request and response operation on various conditions in wireless power transfer supporting two-way communication.

FIG. 25A illustrates a process in which the wireless power transmitter 100 and wireless power receiver 200 transmit and receive a request and response signal in case where a new wireless power receiver 200 approaches when there does not exist the wireless power receiver 200.

Figure 25B:
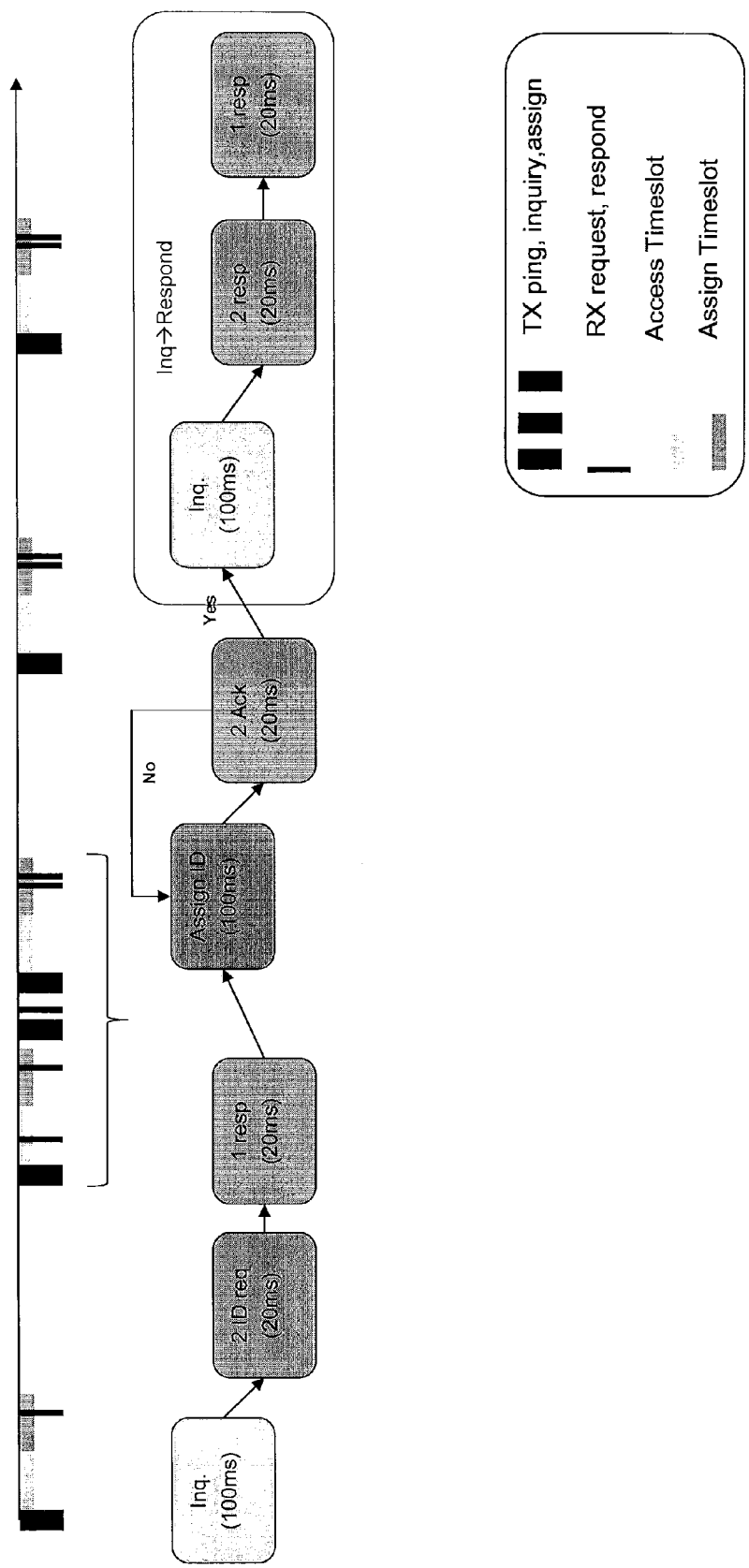

FIG. 25B illustrates a process in which the wireless power transmitter 100 and wireless power receiver 200 transmit and receive a request and response signal in case where a new wireless power receiver 200 approaches when there exists the wireless power receiver 200.

Figure 25C:
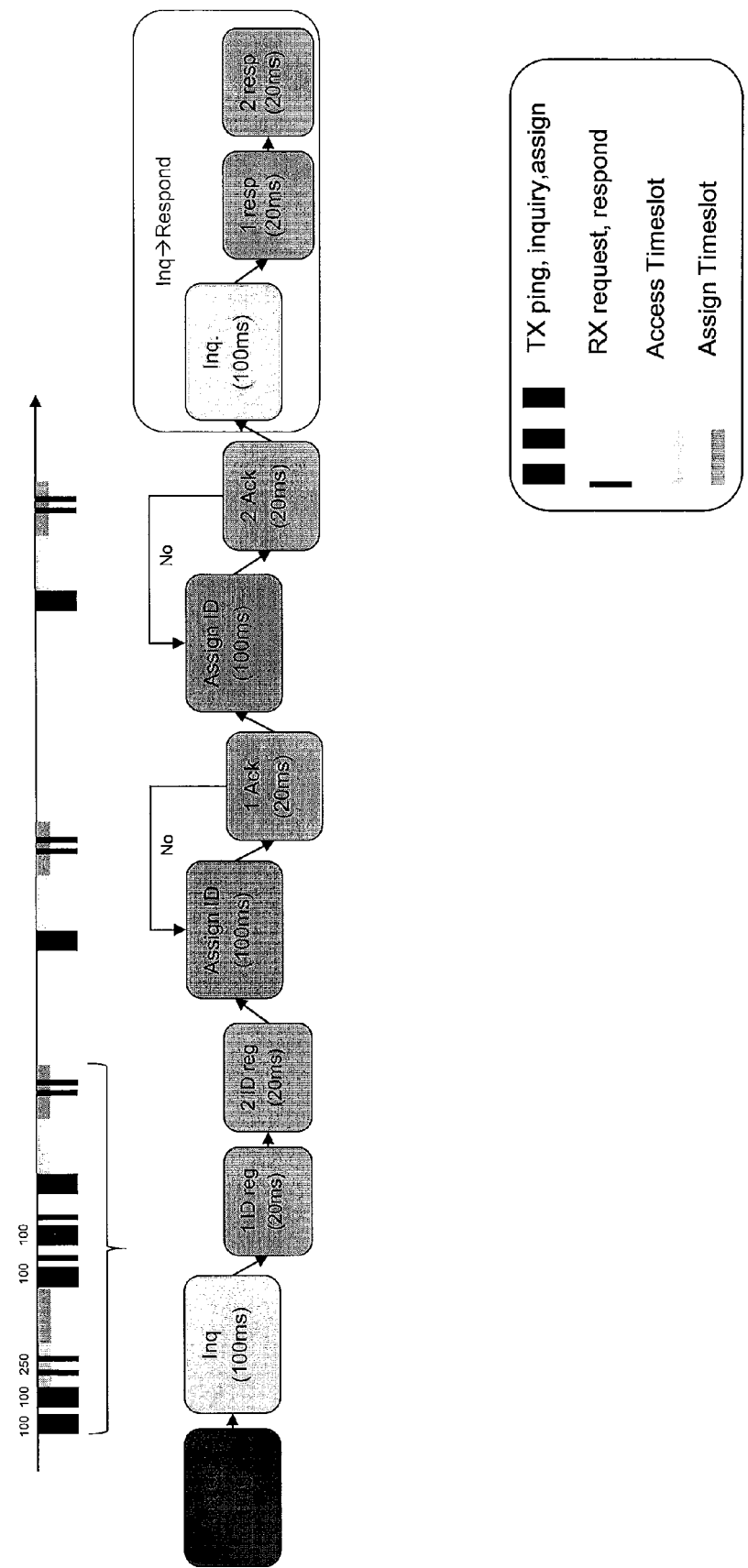

FIG. 25C illustrates a process in which the wireless power transmitter 100 and wireless power receiver 200 transmit and receive a request and response signal in case where new wireless power receivers 200 exist when the wireless power receiver 200 is turned on.

Figure 25D:
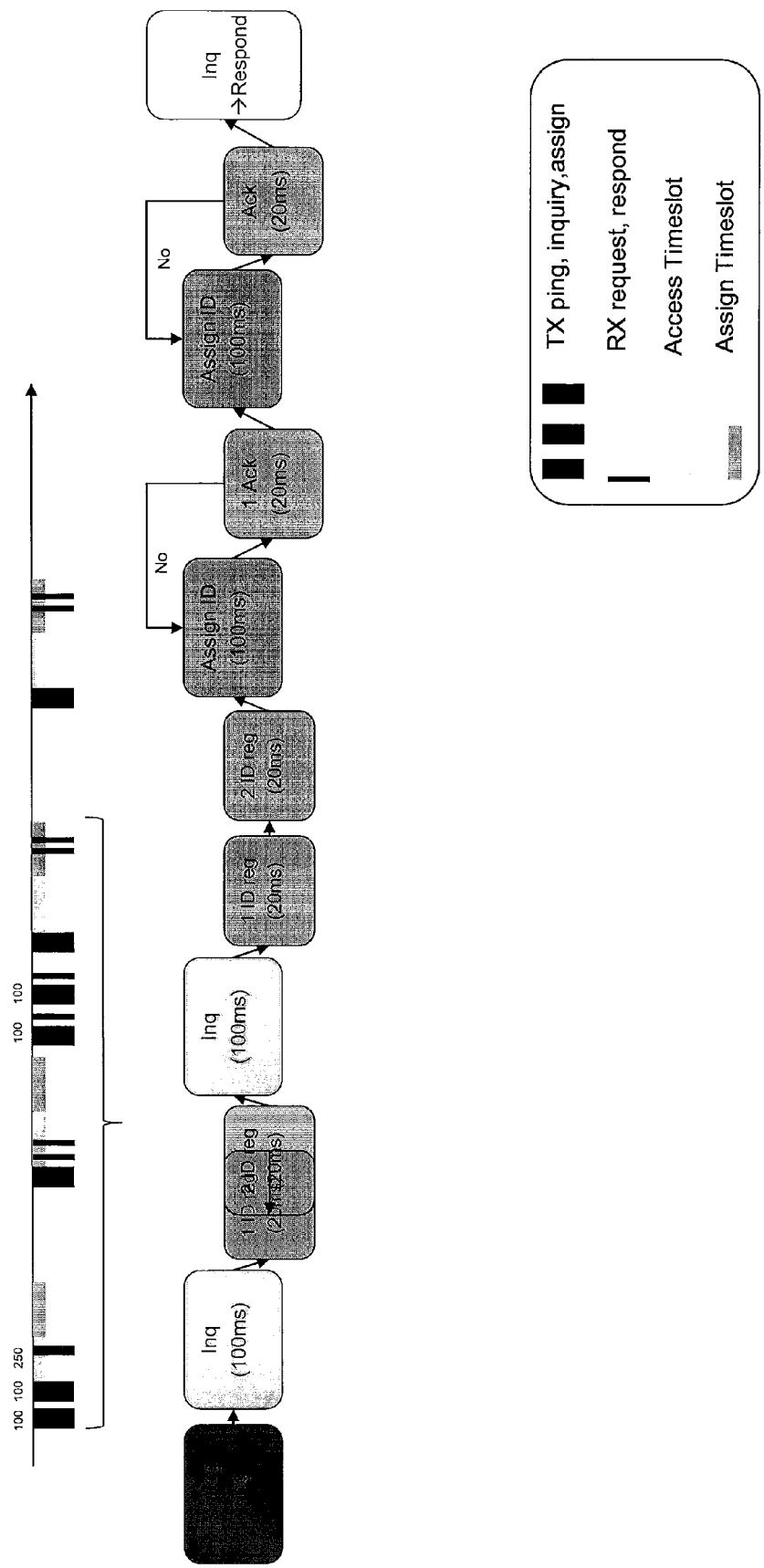

FIG. 25D illustrates a process in which the wireless power transmitter 100 and wireless power receiver 200 transmit and receive a request and response signal in case where new wireless power receivers 200 are collided when the wireless power receiver 200 is turned on.

Figure 26A:
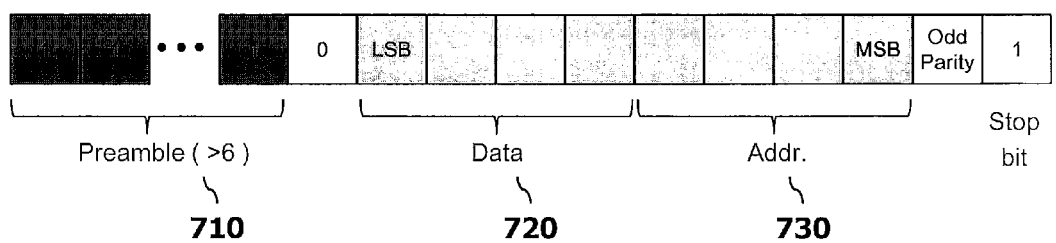

FIGS. 26A through 26C are views illustrating a packet containing a request/response message used during the two-way communication process according to the embodiments disclosed herein.

Referring to FIG. 26A, the wireless power transmitter 100 and electronic device 200 may transmit and receive the data in the form of a packet in which a preamble 710, data 720, and an address 730 for transmission are added to a request/response packet 700.

In case of a packet being transmitted from the wireless power transmitter 100 using 100 ms to the wireless power receiver 200, it is used, for example, to assign a 4-bit address to the wireless power receiver 200 or request charging in the enum state, or transfer a status and command request to the wireless power receiver 200 in a Power transfer state (or phase).

Referring to FIG. 26B, 0x4d denotes that the assign ID of 0x0d is given to the wireless power receiver 200 with the ID of 4, and 0x2d denotes that ID indicates power off (0x02) to 0x0d.

In case of a packet being transmitted from the wireless power receiver 200 using 20 ms to the wireless power transmitter 100, an additional header (for example, 0x06) to the existing message may be used. At this time, an address is inserted to the most significant 4-bit, and data is inserted to the least significant 4-bit. During the approach, the wireless power receiver 200 responds to the approach ID and time slot based on a random value, and replies to a command of the wireless power transmitter 100 at the assigned time subsequent to the approach ID being assigned. FIG. 26C illustrates an exemplary structure of a packet being transmitted from the wireless power receiver 200 to the wireless power transmitter 100.

Referring to FIG. 24 again, when the wireless power receiver 200 requests registration with the wireless power transmitter 100 (S320), for example, the header contains 0x06 with a value of the approach ID, and a random value between 0 and 5, and the time slot will be any one between 0 and 5, and thus 0x06 0x04 shows data being transmitted from the fourth time slot.

Then, when the wireless power transmitter 100 requests charging to the wireless power receiver 200 (S330), for example, the packet contains a 4-bit approach ID and a 4-bit assignment ID. For example, 0x4d shows that the assignment ID with 0x0d is given to the wireless power receiver 200 with the ID of 4.

Then, when the wireless power transmitter 100 request a status request to the wireless power receiver 200 (S340), the packet contains a 4-bit approach ID and a 4-bit status layer. For example, 0xf1 shows making a request to all wireless power receivers 200, and 0xd2 shows instructing power off to the wireless power receiver 200 with the ID of 0x0d.

Then, when the wireless power receiver 200 responds to the wireless power transmitter 100 at the assigned time slot (S350), for example, 0x06 0xd2 shows that the wireless power receiver 200 with the ID of 0x0d replies with 2.

Figure 27:
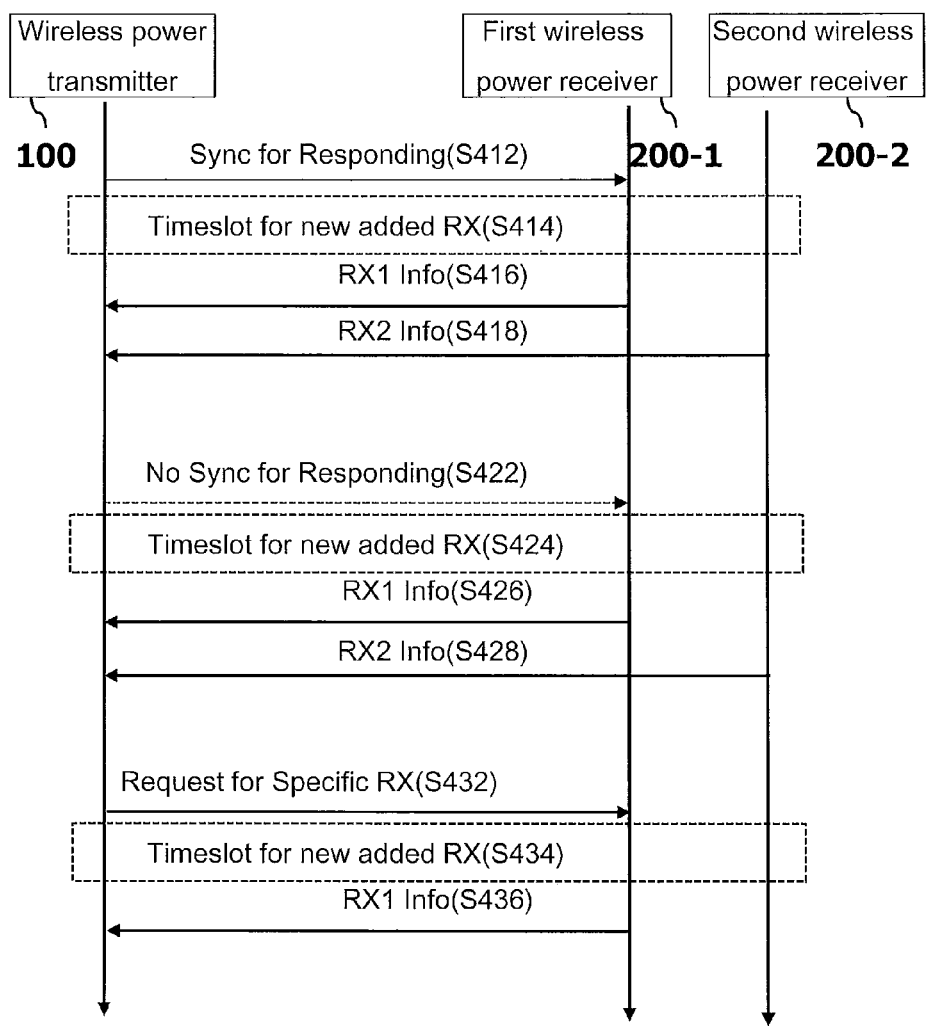
FIG. 27 is a flow chart illustrating a process in which a wireless power transmitter 100 transfers power to a wireless power receiver 200 through a command in wireless power transfer supporting two-way communication.

FIG. 27 is a flow chart illustrating a process in which a wireless power transmitter 100 transfers power to a wireless power receiver 200 through a command in wireless power transfer supporting two-way communication.

Referring to FIG. 27, the wireless power transmitter 100 transmits a synchronization signal for response to the first wireless power receiver 200-1 (S412), and when a time slot for a newly added second wireless power receiver 200-2 is assigned (S414), the first wireless power receiver 200-1 and second wireless power receiver 200-2 transmit their own information, respectively, to the wireless power transmitter 100 (S416, S418).

Furthermore, the wireless power transmitter 100 transmits a non-synchronization signal for response to the first wireless power receiver 200-1 (S422), and when a time slot for a newly added second wireless power receiver 200-2 is assigned (S424), the first wireless power receiver 200-1 and second wireless power receiver 200-2 transmit their own information, respectively, to the wireless power transmitter 100 (S426, S428).

Furthermore, the wireless power transmitter 100 transmits a request for a specific wireless power receiver to the first wireless power receiver 200-1 (S432), and even when a time slot for a newly added second wireless power receiver 200-2 is assigned (S434), only the first wireless power receiver 200-1 transmits its own information to the wireless power transmitter 100 (S436).

Figure 28:
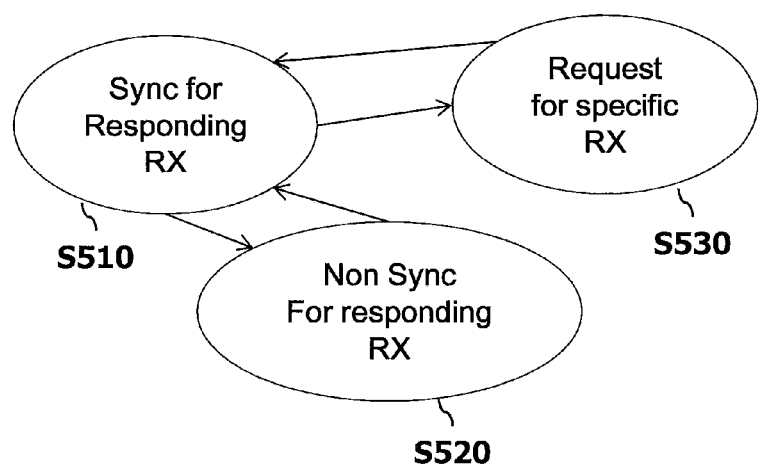
FIG. 28 is a conceptual view illustrating the phase change of a wireless power transmitter 100 during the power transfer process illustrated in FIG. 27.

FIG. 28 is a conceptual view illustrating the phase change of a wireless power transmitter 100 during the power transfer process illustrated in FIG. 27.

The wireless power transmitter 100 may be switched from a state of sending a synchronization signal for the wireless power receiver 200 responding to the wireless power receiver 200 (S510) to a state of sending a non-synchronization signal for the responding wireless power receiver 200 (S520) or switched in the opposite way. Furthermore, the wireless power transmitter 100 may be switched from a state of sending a synchronization signal for the wireless power receiver 200 responding to the wireless power receiver 200 (S510) to a state of sending a request signal for a specific wireless power receiver 200 (S520) or switched in the opposite way.

Second Embodiment

Hereinafter, a method of recognizing a single or multiple wireless power receiver(s) in two-way communication of wireless power transfer according to a second embodiment disclosed herein will be described.

Figure 29:
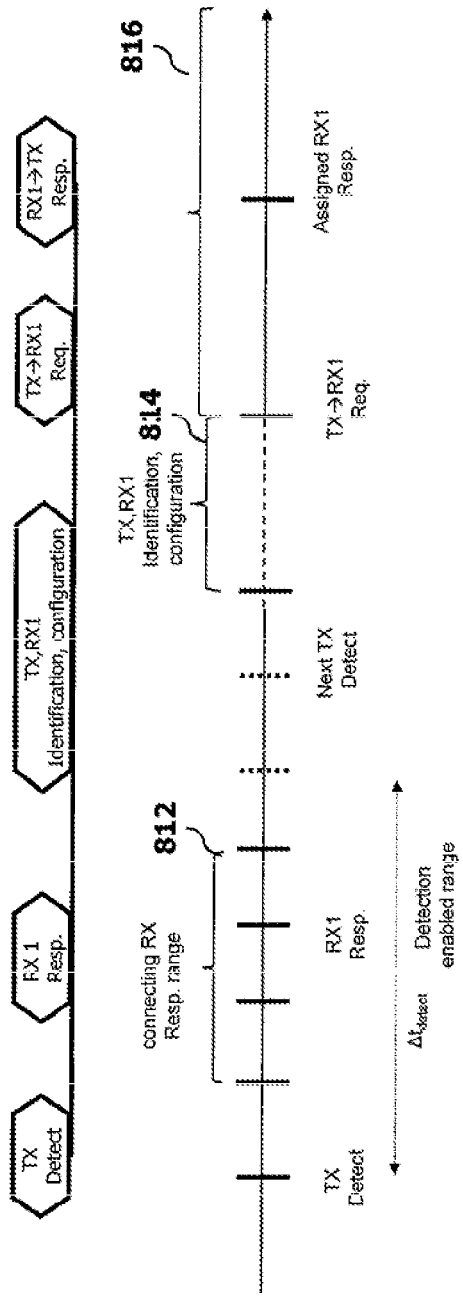
FIG. 29 is a schematic view for explaining a process in which a wireless power transmitter 100 recognizes an initial approach of the wireless power receiver 200 and supplies power during two-way communication on single wireless power transfer.

FIG. 29 is a schematic view for explaining a process in which a wireless power transmitter 100 recognizes an initial approach of the wireless power receiver 200 and supplies power during two-way communication on single wireless power transfer.

During the detection section 812, when there does not exist the wireless power receiver 200, the wireless power transmitter 100 supplies only power, and when the wireless power receiver 200 responds within $\Delta t_{detect}$, the ID received from the wireless power receiver 200 is registered to start two-way communication.

During the identification and configuration section 814, the wireless power transmitter 100 sends a communication packet to the relevant wireless power receiver 200 based on the ID received from the wireless power receiver 200, and performs an identification and configuration process for power supply connection.

When authentication is normally completed during the power transfer section 816, the wireless power transmitter 100 performs communication required for power supply with the wireless power receiver 200 to supply power.

Figure 30:
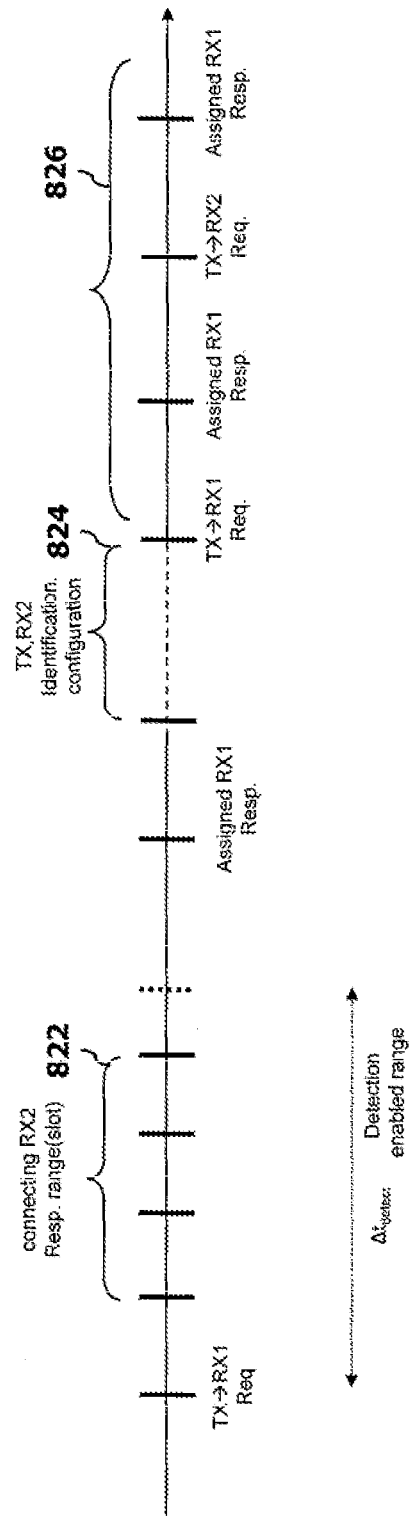
FIG. 30 is a schematic view for explaining the process of recognizing an wireless power receiver 200 and performing communication when the wireless power receiver 200 approaches while a wireless power transmitter 100 performs two-way communication with another wireless power receiver 200 during two-way communication on single wireless power transfer.

FIG. 30 is a schematic view for explaining the process of recognizing an wireless power receiver 200 and performing communication when the wireless power receiver 200 approaches while a wireless power transmitter 100 performs two-way communication with another wireless power receiver 200 during two-way communication on single wireless power transfer.

During the detection section 822, when a new second wireless power receiver 200-2 is approached in a situation that the first wireless power receiver 200-1 performs communication, the second wireless power receiver 200-2 receives power for detection, and then has an authentication procedure during the identification and configuration section 824 when responded to the wireless power transmitter 100 within $\Delta t_{detect}$. The first wireless power receiver 200-1 normally responds according to a request of the wireless power transmitter 100.

During the identification and configuration section 824, subsequently, the wireless power transmitter 100 first grants an ID to the wireless power receiver 200-2 that has requested a connection (when the ID is granted, it is transmitted to an address to which only a new wireless power receiver, namely, the second wireless power receiver 200-2 can respond, and the connection is established through an identification and configuration process between them.

During the power transfer section 826, when authentication is normally completed, information exchange communication required for power supply is carried out for multiple wireless power receivers 200-1, 200-2, respectively, in a duplex (handshaking two-way communication) manner to supply power.

Figure 31:
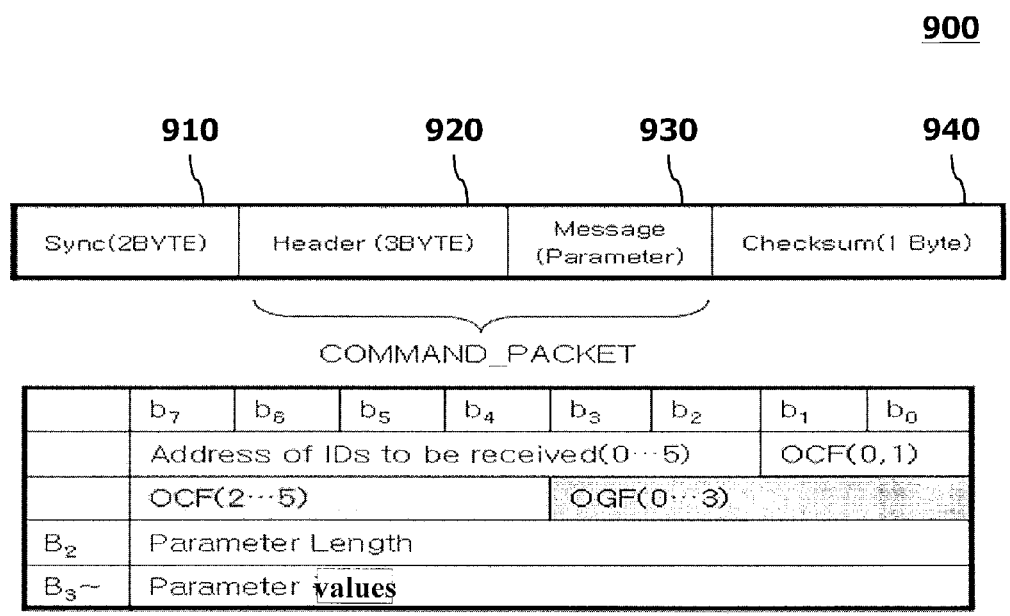
FIG. 31 is a view illustrating an example of a message transmitted and received between a wireless power transmitter 100 and a wireless power receiver performing two-way communication.

FIG. 31 is a view illustrating an example of a message transmitted and received between a wireless power transmitter 100 and a wireless power receiver performing two-way communication.

A packet 900 contained in a message being transmitted and received between the wireless power transmitter 100 and wireless power receiver performing two-way communication may include a sync 910, a header 920, a message 930, and a checksum 940.

The sync 910 with two bytes, for example, is contained in the packet 900 to synchronize message transmission and reception between the wireless power transmitter 100 and wireless power receiver 200, and detect a correct start bit.

The header 920 with three bytes, for example, constitutes a command packet together with the message 930. The message 930 may include a parameter to constitute a command packet together with the header 920. The command packet may include an address for receiving a message, OCF, OGF, a parameter length, and parameter values.

The checksum 940 is contained in the packet 900 to detect an error that can be occurred in a command packet while a message is transmitted.

Figure 32:
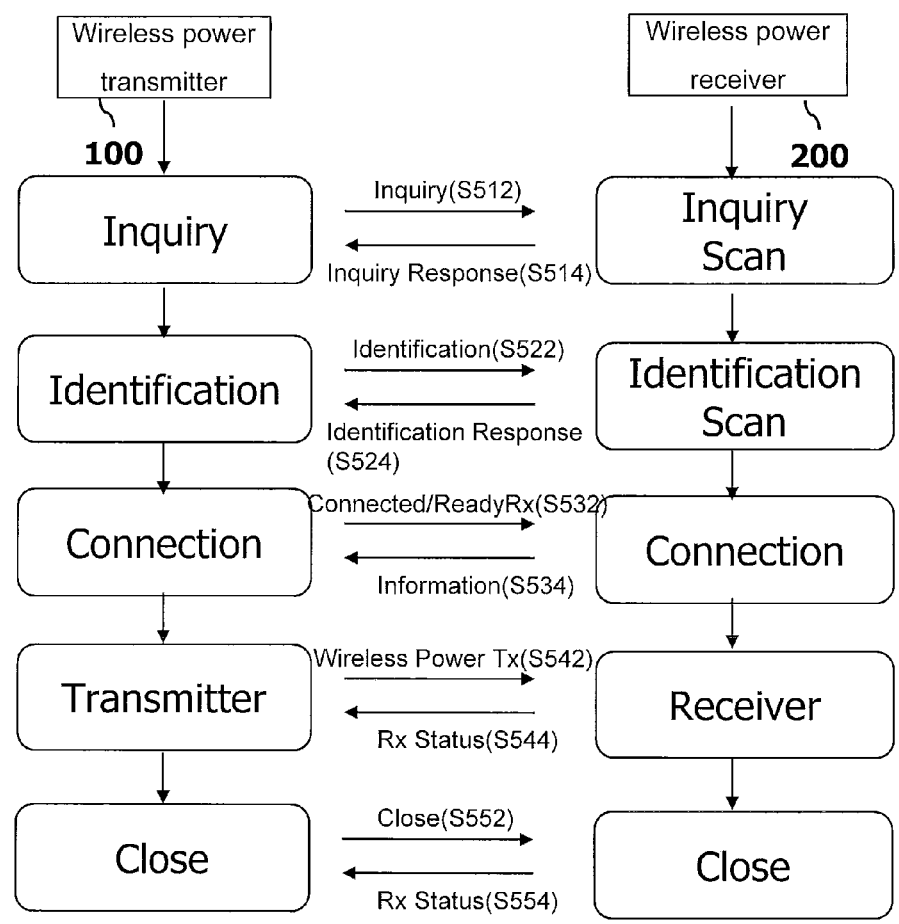
FIG. 32 is a view illustrating a procedure in which a wireless power transmitter 100 and a wireless power receiver 200 perform two-way communication on a signal channel.

FIG. 32 is a view illustrating a procedure in which a wireless power transmitter 100 and a wireless power receiver 200 perform two-way communication on a signal channel.

The wireless power transmitter 100 generates an inquiry message and transmits it to the wireless power receiver 200 (S512). The wireless power receiver 200 performs inquiry scan to transmit an response message to the inquiry (inquiry response) to the wireless power transmitter 100 (S514).

The wireless power transmitter 100 generates a message for requesting identification information and transmits it to the wireless power receiver 200 (S522). The wireless power receiver 200 performs identification scan to transmit a response message to the identification information request (identification response) to the wireless power transmitter 100 (S524).

The wireless power transmitter 100 transmits a connected/ready request message (connected/ready rx) to the wireless power receiver 200 (S532). The wireless power receiver 200 transmits connected/ready request related information to the disk pack 10 (S534).

The wireless power transmitter 100 transmits power in a wireless manner (wireless power tx) to the wireless power receiver 200 through a wireless power signal (S542). The wireless power receiver 200 transmits a status message of the wireless power receiver 200 (rx status) to the wireless power transmitter 100 (S544).

The wireless power transmitter 100 transmits a message indicating the termination of wireless power transfer (close) to the wireless power receiver 200 (S552). The wireless power receiver 200 transmits a status message of the wireless power receiver 200 (rx status) to the wireless power transmitter 100 (S544).

Figure 33A:
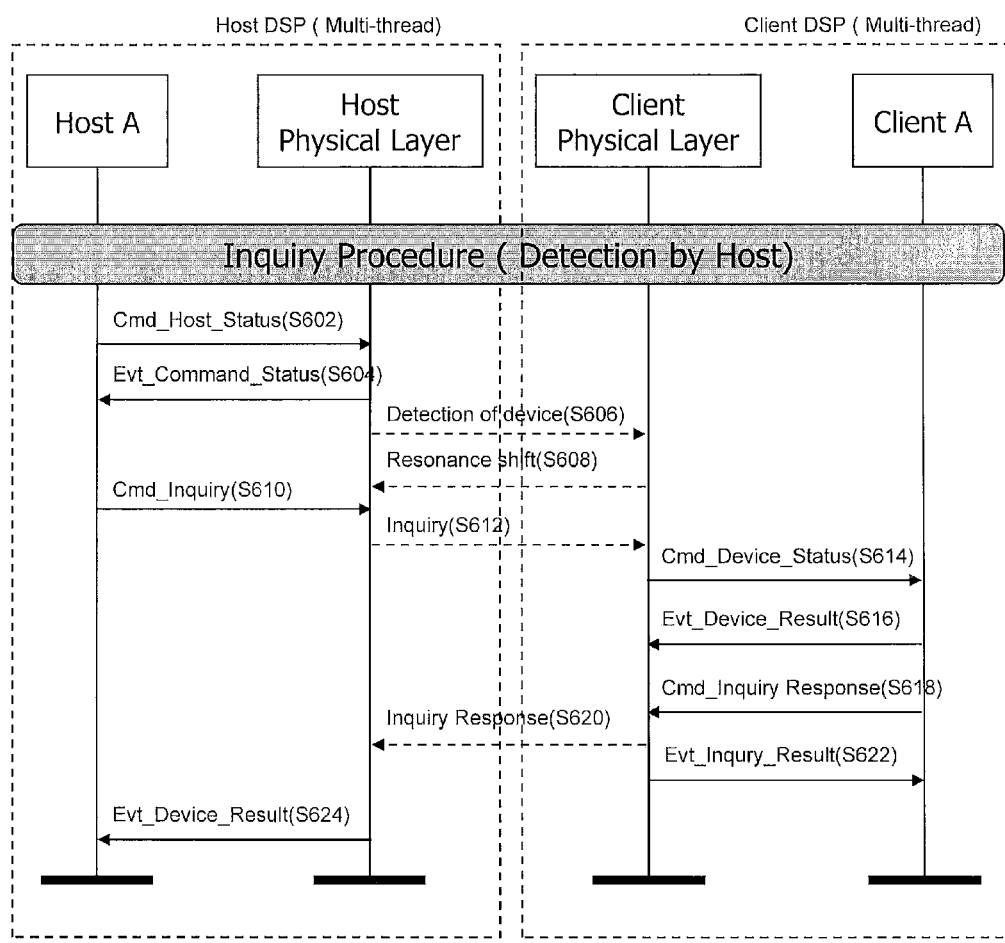
FIG. 33A is a view illustrating a process in which a wireless power transmitter 100 which is the host searches for a wireless power receiver 200 corresponding to the client.

FIG. 33A is a view illustrating a process in which a wireless power transmitter 100 which is the host searches for a wireless power receiver 200 corresponding to the client.

Host A being carried out by HostDSP of the power transmission control unit 112 transmits Cmd_Host_Status to the host physical layer (S602). The host physical layer responds to host A with Evt_command_status (S604).

The host physical layer transmits a device detection message to the client physical layer being carried out by ClientDPS of the power receiving control unit 292 (S606). The client physical layer responds to the host physical layer with resonance shift (S608).

Host A transmits Cmd_Inquiry to the host physical layer (S610). The host physical layer transmits an inquiry message to the client physical layer (S612).

The client physical layer transmits Cmd_Device_Status to client A being carried out by ClientDSP of the power receiving control unit 292 (S614). Client A responds to the client physical layer with Evt_Device_Result (S616). Furthermore, client A responds to the client physical layer with Cmd_Inquiry_Response (S618).

The client physical layer transmits a response to the inquiry to the host physical layer (S620). Furthermore, the client physical layer transmits Evt_Inquiry_Result to client A (S622).

The host physical layer transmits Evt_Device_Result to host A (S624).

Figure 33B:
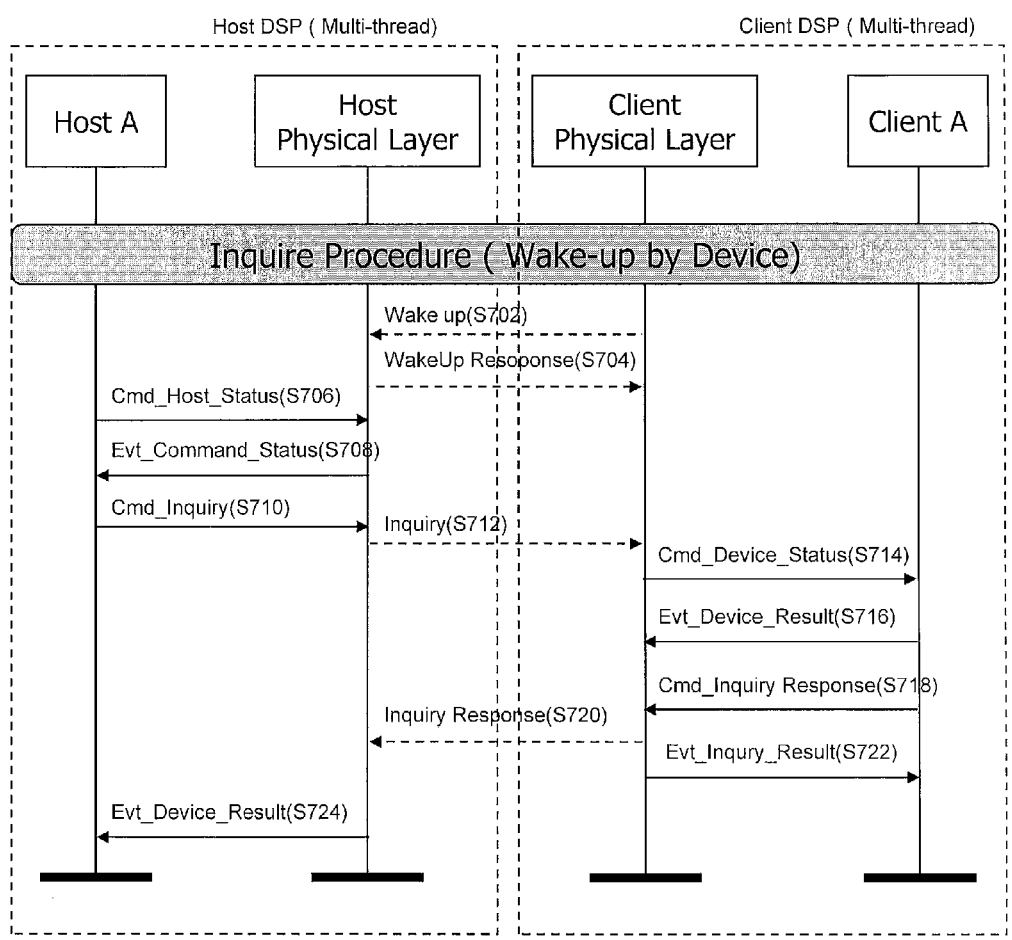
FIG. 33B is a view illustrating a process in which a wireless power receiver 200 which is the client transfers wake-up to a wireless power transmitter 100 corresponding to the host.

FIG. 33B is a view illustrating a process in which a wireless power receiver 200 which is the client transfers wake-up to a wireless power transmitter 100 corresponding to the host.

First, the client physical layer transmits a wake-up message to the host physical layer (S702). The host physical layer transmits a response message to the wake-up message to the client physical layer (S704).

Host A transmits Cmd_Host_Status to the host physical layer (S706). The host physical layer transmits Evt_Command_Status to host A (S708). The description of the following steps of S710 to S724 is similar to that of the foregoing steps of S610 to S624 described with reference to FIG. 33A, and thus the detailed description thereof will be omitted.

Third Embodiment

Hereinafter, a method for ID recognition and collision resolution between wireless power receivers in wireless power transfer using two-way communication will be described.

The wireless power transmitter 100 and wireless power receiver 200 may perform in-band, half-duplex, and two-way communication. In other words, it may take a process in which the wireless power receiver 200 responds to a request of the wireless power transmitter 100.

Furthermore, the wireless power transmitter 100 and wireless power receiver 200 may detect an ID and solve a collision like NFC. It means that a plurality of wireless power receivers 200 can perform communication with the wireless power transmitter 100 at the same time without any collision.

Furthermore, when detecting a new wireless power receiver 200, the wireless power transmitter 100 may periodically perform a new ID detection process.

Furthermore, when detecting the remaining wireless power receiver 200, the wireless power transmitter 100 may use a request in a time-out manner.

Furthermore, in order to detect a rogue wireless power receiver, the wireless power transmitter 100 monitors all the entire power levels, and allows the wireless power receiver being obstructed to provide a correct response (ID information) to be switched to a non-operating state (or ignored).

Furthermore, the features of ID recognition and collision resolution in wireless power transfer are as follows.

Time slot is formed as short as possible to the maximum to reduce the possibility of a collision between receivers. Furthermore, when there occurs a collision between the wireless power receivers 200, the wireless power transmitter 100 may inform vacant time slot information to the wireless power receiver 200 using two-way communication and the wireless power receiver 200 may retry ID detection. According to an embodiment, the wireless power receiver 200 that has completed ID detection may perform power transfer.

When time priority can be checked in a minute manner even in the time slot, the wireless power transmitter 100 assigns the wireless power receiver 200 in which a collision has occurred to a vacant time slot to perform power transfer.

According to an embodiment disclosed herein, when a collision has occurred between the wireless power receivers, power transfer can be immediately implemented without switching the wireless power receiver 200 that has already detected the ID to a sleep mode.

Figure 34:
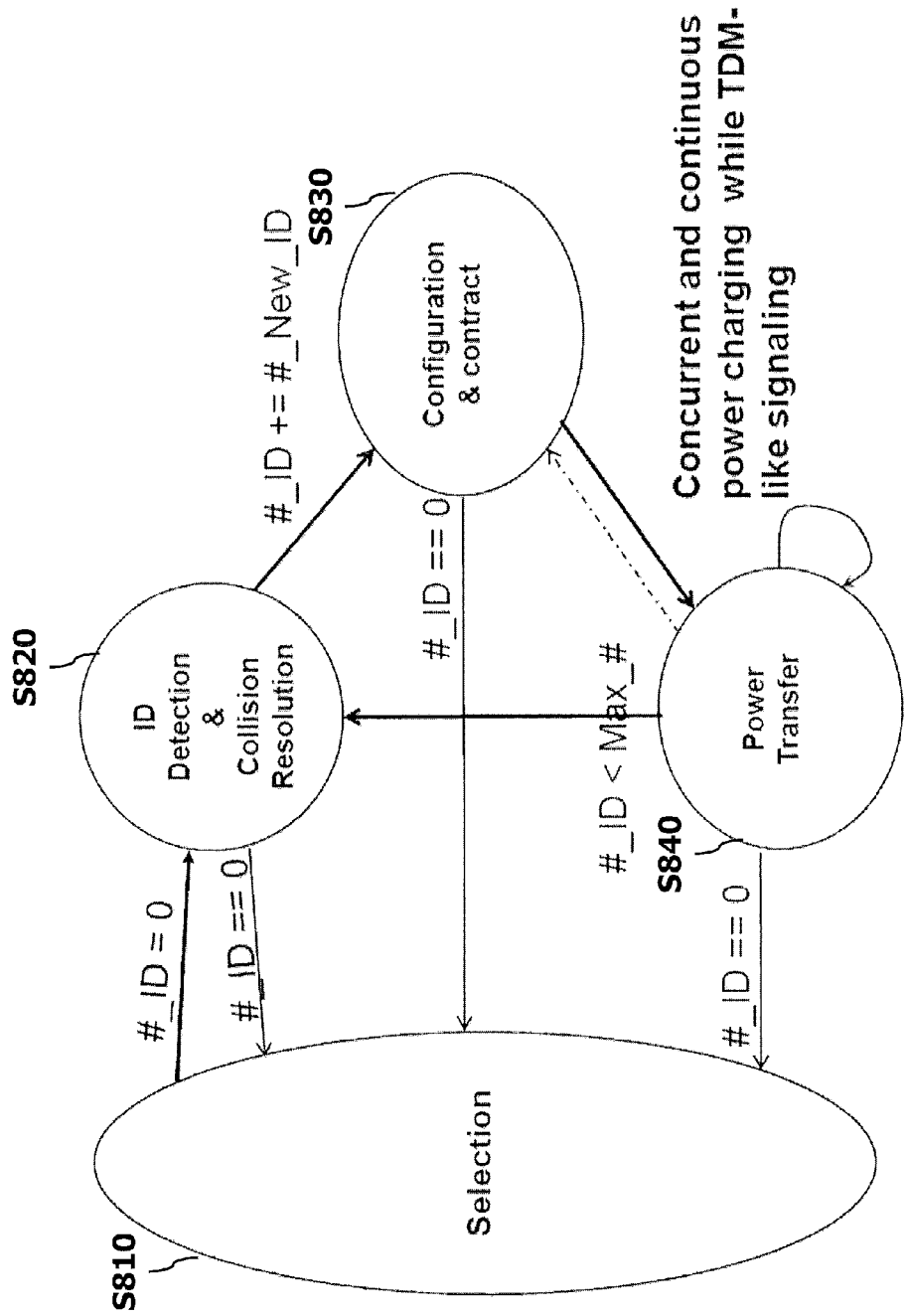
FIG. 34 is a conceptual view illustrating the phase change of a wireless power transmitter 100 in the process of the wireless power transmitter 100 solving a collision between wireless power receivers.

FIG. 34 is a conceptual view illustrating the phase change of a wireless power transmitter 100 in the process of the wireless power transmitter 100 solving a collision between wireless power receivers.

In the selection state (or phase) (S810), the wireless power transmitter 100 initializes an ID list. If a new wireless power receiver 200 is detected in the ID detection and collision resolution state (S820), then the relevant ID, namely, #NEW_ID is added to the list. If a connection is established through an authentication process or the like in the configuration and contract state (S830), then it is switched to the Power transfer state (or phase) (S840). If the number of IDs contained in the ID list is less than a threshold value (for example, the number of wireless power receivers that can be charged at a time) in the Power transfer state (or phase) (S840), then the wireless power transmitter 100 may perform the operation of the ID detection and collision resolution state (S820). At this time, the operation of the Power transfer state (or phase) (S840) can be also maintained.

On the other hand, when wireless power transfer is terminated and the wireless power receiver is not detected any more, for example, in the ID detection and collision resolution state (S820), configuration and contract state (S830) and Power transfer state (or phase) (S840), the wireless power transmitter 100 may be switched to the selection state (or phase) (S810) to initialize the ID list.

Figure 35:
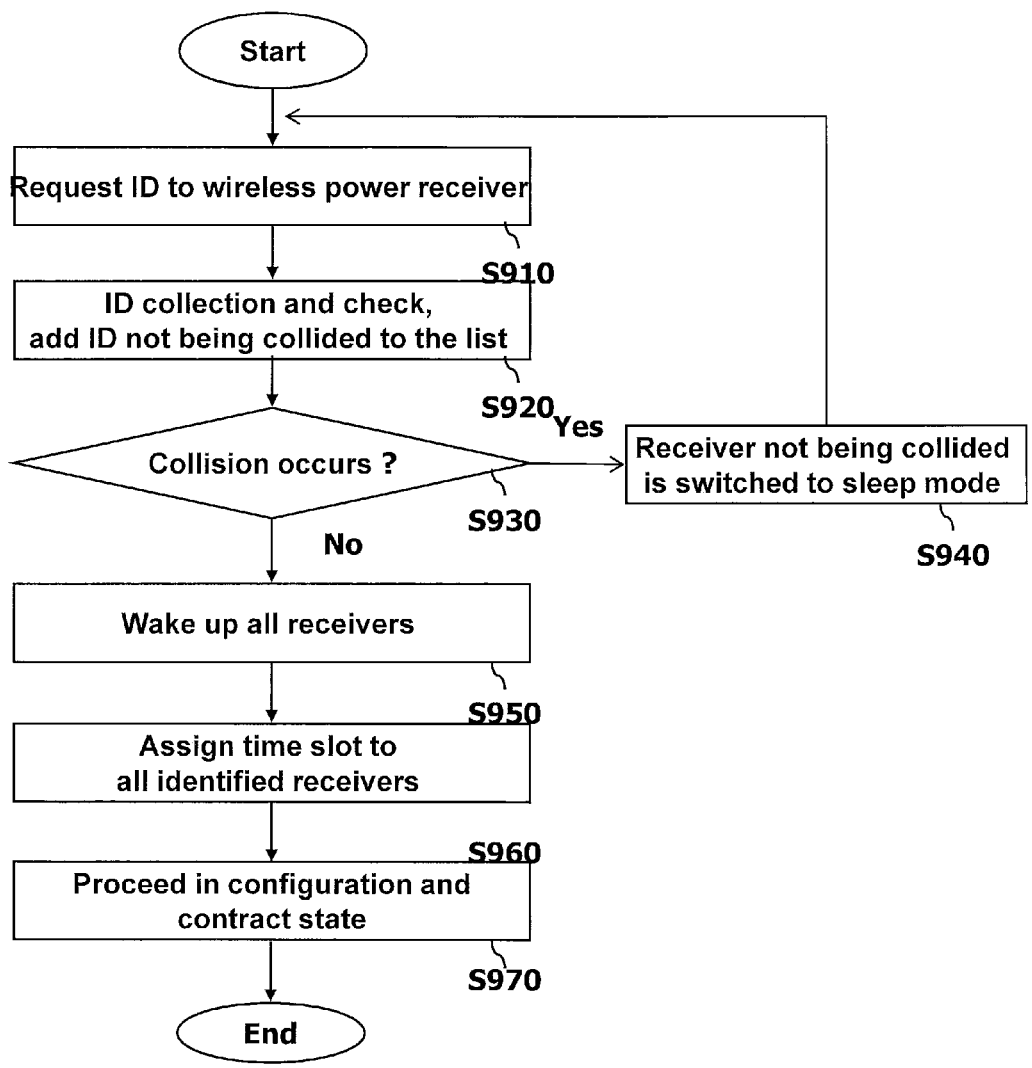
FIG. 35 is a flow chart illustrating a process in which a wireless power transmitter 100 disclosed herein solves a collision between wireless power receivers.

FIG. 35 is a flow chart illustrating a process in which a wireless power transmitter 100 disclosed herein solves a collision between wireless power receivers.

The wireless power transmitter 100 requests an active wireless power receiver 200 to transmit an ID (S910). Accordingly, if the ID is transmitted from the wireless power receiver 200, then the wireless power transmitter 100 collects and checks it, and adds the ID that is not collided to the list (S920). At this time, the wireless power transmitter 100 waits for the reception of an ID during the preset N time slots.

The wireless power transmitter 100 determines whether a collision has occurred between wireless power receivers (S930), and if a collision has occurred, the wireless power receivers having detected IDs for which a collision has not occurred are switched to a sleep mode (S940). The wireless power transmitter 100 returns to the step S910 again to request an active wireless power receiver 200 to transmit an ID.

When a collision has not occurred in the step S930, the wireless power transmitter 100 wakes up all wireless power receivers (S950), and assigns a time slot to all the identified wireless power receivers (S960). Subsequently, the wireless power transmitter 100 proceeds to a configuration and contract state (S970).

Figure 36:
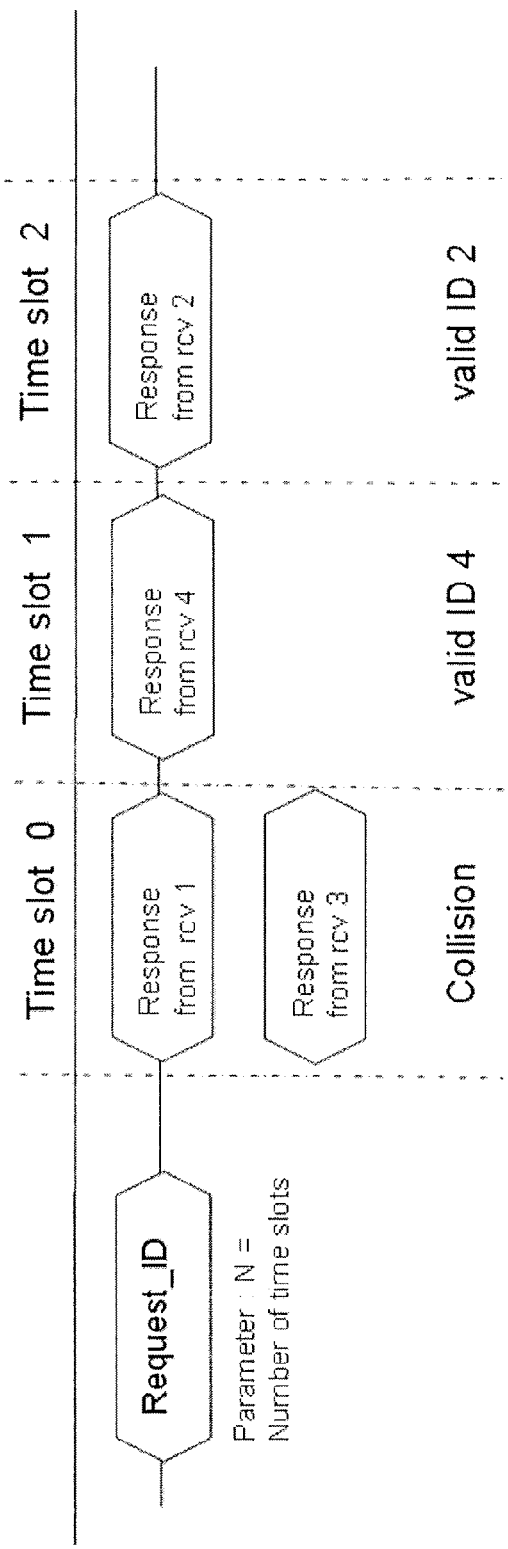
FIG. 36 is a conceptual view illustrating an ID recognition and collision resolution process of a wireless power transmitter 100 requiring a sleep mode of the wireless power receiver 200.

FIG. 36 is a conceptual view illustrating an ID recognition and collision resolution process of a wireless power transmitter 100 requiring a sleep mode of the wireless power receiver 200.

The wireless power transmitter 100 can requests an ID to the wireless power receivers. At this time, the number of time slots can be set to N.

The wireless power receiver 200 selects one in a random manner among time slots from 0 to N−1 in response to a request command of the wireless power transmitter 100, and transmits an ID to the wireless power transmitter 100 through the selected time slot. At this time, a collision has not occurred in time slots 1 and 2, but two wireless power receivers (rcv1, rcv3) may be collided with each other at time slot 0.

Figure 37:
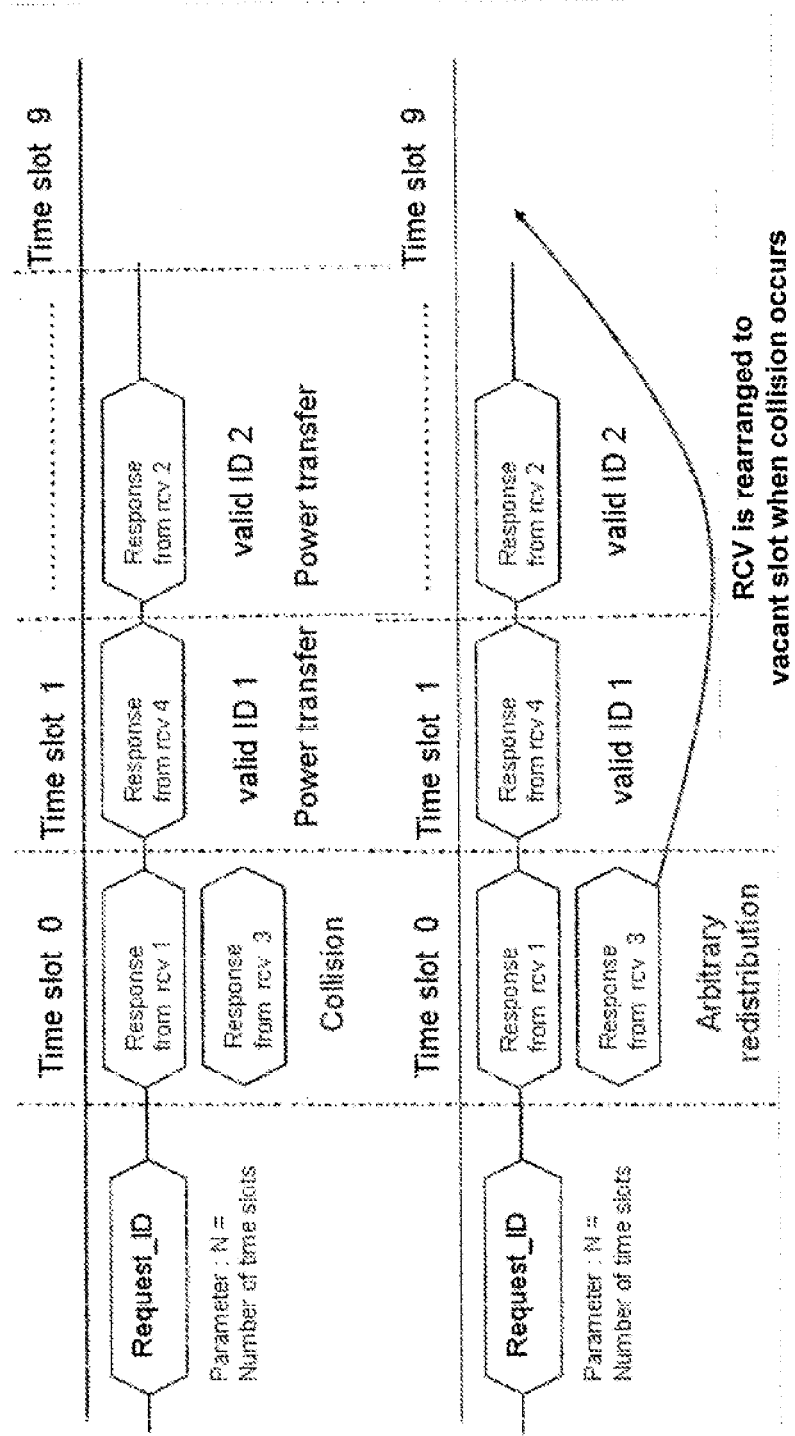
FIG. 37 is a conceptual view illustrating a quick ID recognition and collision resolution process of a wireless power transmitter 100 according to an embodiment disclosed herein.

FIG. 37 is a conceptual view illustrating a quick ID recognition and collision resolution process of a wireless power transmitter 100 according to an embodiment disclosed herein.

In a situation that two wireless power receivers (rcv1, rcv3) are collided with each other at the foregoing time slot 0, the wireless power receivers (rcv4, rcv2) corresponding to the remaining two time slots in which a collision has not occurred may immediately perform an identification and configuration process to receive power in a wireless manner from the wireless power transmitter 100.

On the contrary, for the wireless power receivers corresponding to time slot 0, the wireless power transmitter 100 does not allow a collision to occur any more through a redistribution process. For example, the wireless power transmitter 100 assigns one wireless power receiver (rcv3) among the wireless power receivers (rcv1, rcv3) in which a collision has occurred to another unoccupied time slot (for example, time slot 9).

Figure 38B:
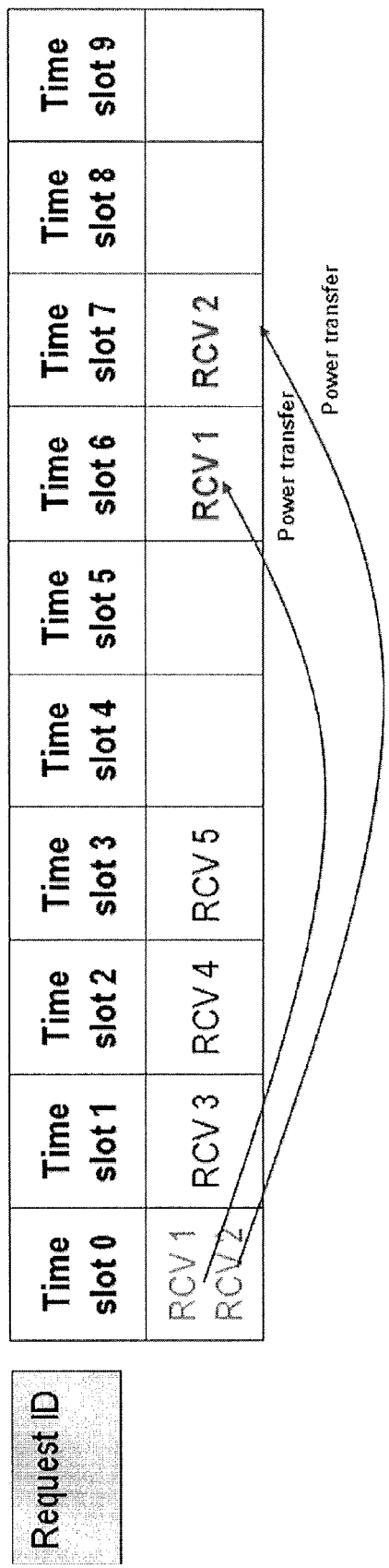

FIGS. 38A and 38B are other conceptual views illustrating an ID recognition and collision resolution process of a wireless power transmitter 100 not requiring a sleep mode of the wireless power receiver 200 according to an embodiment disclosed herein.

Referring to FIG. 38, in a state that total 10 time slots from 0 to 9 are secured, the wireless power receivers (RCV1, RCV2) may be collided with each other at time slot 0. At the time slots 1 to 3, each wireless power receiver (RCV3, RCV4, RCV5) occupies the relevant time slot without collision. The remaining time slots 4 to 9 are remained as vacant slots without being occupied by any wireless power receiver.

On the other hand, the wireless power receivers (RCV3, RCV4, RCV5) in which a collision has not occurred receive wireless power through a wireless power signal from the wireless power transmitter 100 through each time slot.

Referring to FIG. 38B, the wireless power transmitter 100 detects a situation that a collision has occurred at time slot 0, and performs a process of redistributing the wireless power receivers (RCV1, RCV2) in which a collision has occurred. The wireless power receivers (RCV1, RCV2) can be redistributed in various ways, and for example, the wireless power receiver (RCV1) may be assigned to time slot 6, and the wireless power receiver (RCV2) may be assigned to time slot 7. Then, the wireless power receiver (RCV1) and wireless power receiver (RCV2) may receive power in a wireless manner through a wireless power signal from the wireless power transmitter 100 through the time slots 6 and 7, respectively.

According to a first embodiment disclosed herein, a wireless power transmitter may allow a wireless power receiver that has transmitted identification information in a valid manner to be switched to a sleep mode, thereby solving a problem that a collision occurs when recognizing an initial wireless power receiver.

Furthermore, according to a second embodiment disclosed herein, when a wireless power transmitter transmits a request message to a wireless power receiver, the identification information of the relevant wireless power receiver is also transmitted at the same time, thereby solving a problem that a collision occurs when recognizing a single/multiple wireless power receiver(s).

In addition, according to a third embodiment disclosed herein, a wireless power transmitter may participate in the time slot assignment of a wireless power receiver, thereby solving ID recognition and collision between wireless power receivers.

What is claimed is:

1. A wireless power transmitter, comprising:
   a transceiver configured to transmit and/or receive a message to and/or from a wireless power receiver; and
   a controller configured to control the transceiver to transmit a message for requesting identification information to the wireless power receiver, and determine whether the identification information is validly received from the wireless power receiver by the transceiver in response to the identification information request, and control the transceiver to transmit a message for requesting sleep mode switching to the wireless power receiver when the identification information is validly received by the transceiver.

2. The wireless power transmitter of claim 1, wherein the controller controls the transceiver to transmit a message for requesting identification information to the wireless power receiver again when the identification information is not validly received.

3. The wireless power transmitter of claim 1, wherein the controller is changed to a power transmission state when a response to the identification information request is not received any more.

4. The wireless power transmitter of claim 1, wherein the controller registers the identification information of the wireless power receiver.

5. The wireless power transmitter of claim 1, wherein the controller determines that the identification information is validly received when a first message for receiving identification information from the wireless power receiver is not collided with a second message for receiving identification information from another wireless power receiver.

6. A wireless power transmitter, comprising:
a transceiver configured to transmit and/or receive a message to and/or from a wireless power receiver; and
a controller configured to control the transceiver to transmit a message for requesting identification information to the wireless power receiver, and receive a message containing identification information from a first wireless power receiver in response to the identification information request, and transmit a message for requesting status information to the first wireless power receiver,
wherein the message for requesting status information comprises the identification information of the first wireless power receiver.

7. The wireless power transmitter of claim 6, wherein the controller controls the transceiver to receive a message containing status information from the first wireless power receiver in response to the identification information request from the wireless power receiver.

8. The wireless power transmitter of claim 7, wherein the controller comprises a controller configured to control the transceiver to receive a message containing identification information from a second wireless power receiver in response to the identification information request, and transmit a message for requesting status information to the second wireless power receiver, and
the message for requesting status information comprises the identification information of the second wireless power receiver.

9. The wireless power transmitter of claim 8, wherein the controller controls the transceiver to receive a message containing status information from the second wireless power receiver in response to the identification information request from the wireless power receiver.

10. The wireless power transmitter of claim 8, wherein the first identification information and the second identification information are different from each other.

11. The wireless power transmitter of claim 7, wherein the message containing status information further comprises the identification information of the first wireless power transmitter.

12. The wireless power transmitter of claim 6, wherein the controller registers the identification information of the wireless power receiver.

13. A wireless power transmitter, comprising:
a transceiver configured for transmitting and/or receiving a message to and/or from a wireless power receiver; and
a controller configured to control the transceiver to transmit a message for requesting identification information to the wireless power receiver, and determine whether the identification information is validly received from the first and the second wireless power receiver by the transceiver in response to the request, wherein the identification information is received through a time slot selected by the first and the second wireless power receiver, respectively, among a plurality of time slots, and change the time slot assigned to at least one of the first and the second wireless power receiver when the identification information is not validly received from the first and second wireless power receiver.

14. The wireless power transmitter of claim 13, wherein the controller transmits information on the changed time slot to at least one of the first and second wireless power receiver.

15. The wireless power transmitter of claim 13, wherein the controller controls the transceiver to transmit a message for the identification information to the wireless power receiver again.

16. The wireless power transmitter of claim 13, wherein the controller registers the identification information of the first and second wireless power receiver when the identification information is validly received from the first and second wireless power receiver.

17. The wireless power transmitter of claim 13, wherein the message for requesting identification information comprises the number of the plurality of time slots.

18. The wireless power transmitter of claim 17, wherein the controller waits for a period of time corresponding to the number of the plurality of time slots subsequent to transmitting the message for requesting identification information.

19. The wireless power transmitter of claim 13, wherein the controller is immediately changed to a power transmission state when identification information is validly received from the first and second wireless power receiver.

20. The wireless power transmitter of claim 13, wherein the controller changes a time slot assigned to at least one of the first and second wireless power receiver to a vacant time slot.

* * * * *